(12) United States Patent
Davis et al.

(10) Patent No.: US 6,609,357 B1
(45) Date of Patent: Aug. 26, 2003

(54) LAWN AND GARDEN CONTROL MODULE

(75) Inventors: Dennis L. Davis, Chagrin Falls, OH (US); Arthur James Harvey, Mantua, OH (US); Theodore G. Wetzel, Mayfield, OH (US); James Rundo, Chesterland, OH (US)

(73) Assignee: Delta Systems, Inc., Streetsboro, OH (US)

( * ) Notice: Subject to any disclaimer, the term of this patent is extended or adjusted under 35 U.S.C. 154(b) by 7 days.

(21) Appl. No.: 10/062,029

(22) Filed: Jan. 31, 2002

(51) Int. Cl.[7] .......................... A01D 69/00; B62D 11/04
(52) U.S. Cl. ........................ 56/10.2 A; 701/25
(58) Field of Search .................. 56/1, 10.2 R, 10.2 A, 56/13.5, 10.5, 10.8, 13.3, 11.8, 11.9, DIG. 15; 701/25, 28; 180/168, 169, 6.5

(56) References Cited

U.S. PATENT DOCUMENTS

| 4,296,409 A | 10/1981 | Whitaker et al. |
| 4,376,298 A | 3/1983 | Sokol et al. |
| 4,551,801 A | 11/1985 | Sokol |
| 5,644,491 A | 7/1997 | Fiske et al. |
| 5,743,347 A | 4/1998 | Gingerich |
| 5,934,051 A | 8/1999 | Hahn |
| 6,009,358 A | 12/1999 | Angott et al. |
| 6,082,084 A | 7/2000 | Reimers et al. |

OTHER PUBLICATIONS

Photograph SCAG Lawnmower.

*Primary Examiner*—Robert E. Pezzuto
(74) *Attorney, Agent, or Firm*—Watts, Hoffman, Fisher & Heinke Co., LPA

(57) ABSTRACT

Control method and apparatus for a lawn mower or a lawn and garden tractor that includes a programmable controller for monitoring a mower/tractor status. The controller includes an interface for monitoring inputs relating to a status of the mower/tractor and controlling outputs that regulate operation of the mower/tractor. The controller also includes a memory for storing instructions to implement a control over operation of the mower/tractor. The instructions include instructions for determining a safety status condition based on sensed inputs and outputting a signal from the interface of the controller that inhibits operation of a lawn mower/tractor motor or engine in response to a determination of the safety status condition.

67 Claims, 21 Drawing Sheets

LAWN AND GARDEN CONTROL MODULE

FIELD OF THE INVENTION

The present invention concerns an electronic control module for monitoring and controlling operation of a lawn mower or garden tractor.

BACKGROUND ART

Representative control systems for use with riding lawnmowers are disclosed in U.S. Pat. No. 5,743,347 to Gingrich and U.S. Pat. No. 6,082,084 to Reimers et al. U.S. Pat. No. 5,644,491 entitled "Self Contained Multi-function Engine Monitor and Timer for Providing Engine Running Time, Job Time, Service Time and Tachometer Functions" concerns an engine monitor for use with a motor vehicle.

A prior art riding lawn mower is produced by SCAG having a place of business in Mayville, Wis. This SCAG lawn mower promotes safe operation of the lawn mower by means of a monitoring performed by a programmable control module.

The SCAG mower includes an input to the programmable controller that monitors a seat switch, a power take off (PTO) switch, a brake switch and control levers or pivoting arms by means of which the operator controls steering and movement of the riding lawn mower. In order to start the lawn mower, the arms must be pivoted outwardly away from their in use position. During use of the lawn mower, the arms pivot back to an in use position that allows the user to control speed and direction of movement.

The SCAG controller prevents starting of a lawn mower engine unless all four of the aforementioned switches have a particular state. In boolean algebra format the sensed state required for a start of the engine is: SafeStart=(PTO off) AND (ARMS out) and (SEAT on) and (BRAKE on). This means that the user can only start the lawn mower engine if the switches indicate the PTO switch is open the ARMS out switch is closed, the seat switch is closed and the brake switch is closed. In an analogous fashion, the boolean algebra expression for a safe running condition is: SafeRun= [(Seat ON) OR ((BRAKE on) AND (PTO off))] AND NOT [(ARMS not out) AND (BRAKE on)]. If the safe run condition is not satisfied, the magneto is grounded.

SUMMARY OF THE INVENTION

Control apparatus constructed in accordance with an exemplary embodiment of the invention monitors and controls operation of a lawn mower or garden tractor. A typical lawn mower or garden tractor includes a clutch for engaging a power take off driven device such as a cutting blade. The lawn mower or garden tractor also includes an ignition system that controls running of its engine or motor. The invention has utility with a lawn mower or garden tractor that is gasoline powered or electric powered and may be used in a riding or a push lawn mower.

The control apparatus includes a programmable controller for monitoring a status of a lawn mower or garden tractor. The controller includes an interface for monitoring inputs relating to a status of the lawn mower or garden tractor and controlling outputs that regulate operation of the lawn mower/tractor. The controller also includes a memory for storing instructions to implement a control over operation of the lawn mower/tractor.

In one exemplary embodiment, the instructions determine a safety status condition based on sensed inputs and cause the controller to output a signal from the interface of the controller that inhibits operation of the motor or engine in response to a sensed unsafe condition.

These and other objects, advantages and features of the invention will become better understood from a review of a detailed exemplary embodiment of the invention and the accompanying drawings.

DESCRIPTION OF EXEMPLARY EMBODIMENT OF THE PRESENT INVENTION

Figure 1:
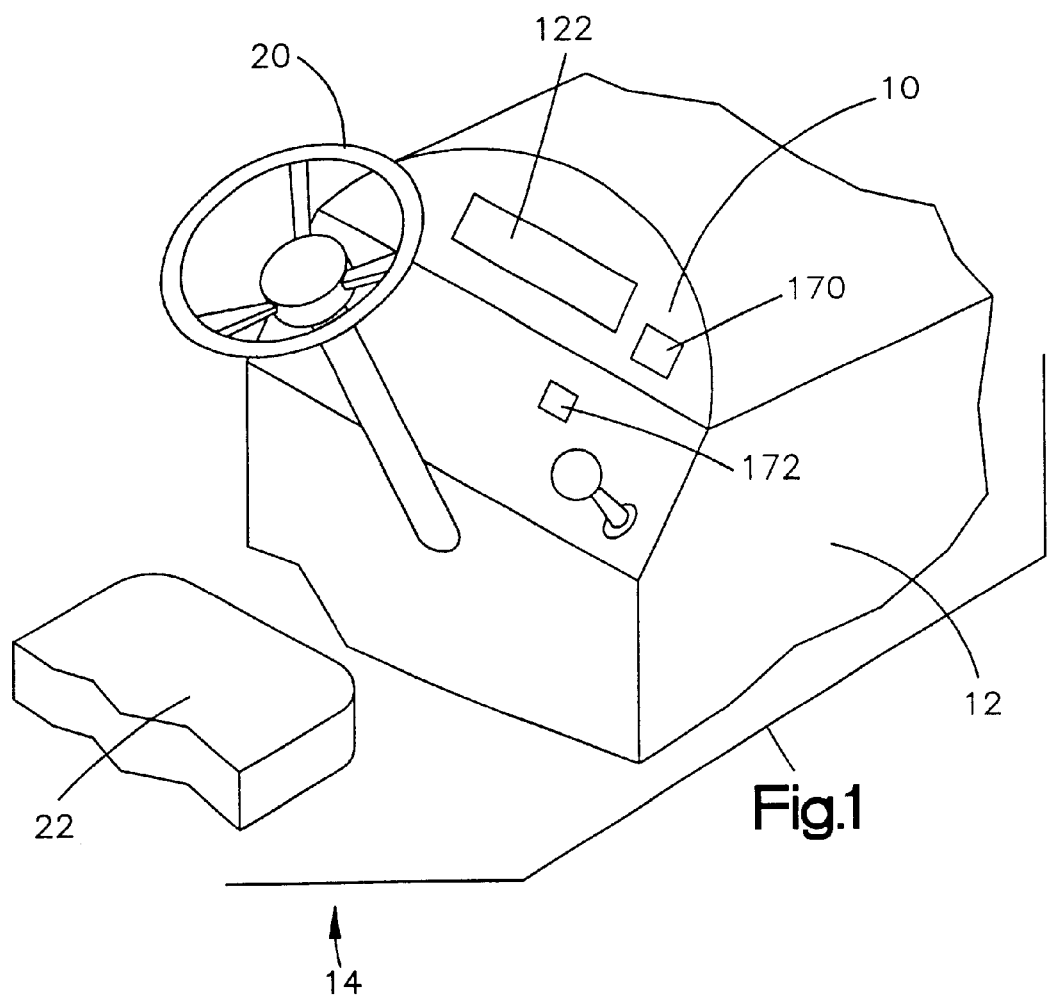
FIG. 1 is a perspective depiction of a portion of a riding lawn mower showing a position of a control console with respect to a lawnmower seat on the riding lawn mower.

FIG. 1 is a representative depiction of an operator control panel 10 mounted to a body 12 of a lawn and garden tractor 14. The particular tractor depicted in FIG. 1 has a blade mounted to the frame and hence is more commonly referred to as a riding lawn mower 14. The control panel 10 is located directly in front of a steering wheel 20 that allows an operator seated on a seat 22 to steer the lawn mower as it moves with respect to ground. The particular lawn mower depicted in FIG. 1 has a gasoline fueled engine for providing motive power to the riding lawn mower and includes a gas tank for supplying fuel to the engine. The engine has an output shaft that drives wheels that support the frame and body 12. The lawn and garden tractor industry is at present dominated by gasoline powered engine powered tractors but the invention disclosed and claimed in the present application could be used with an electric powered lawn and garden tractor or with a hybrid powered tractor.

Figure 2:
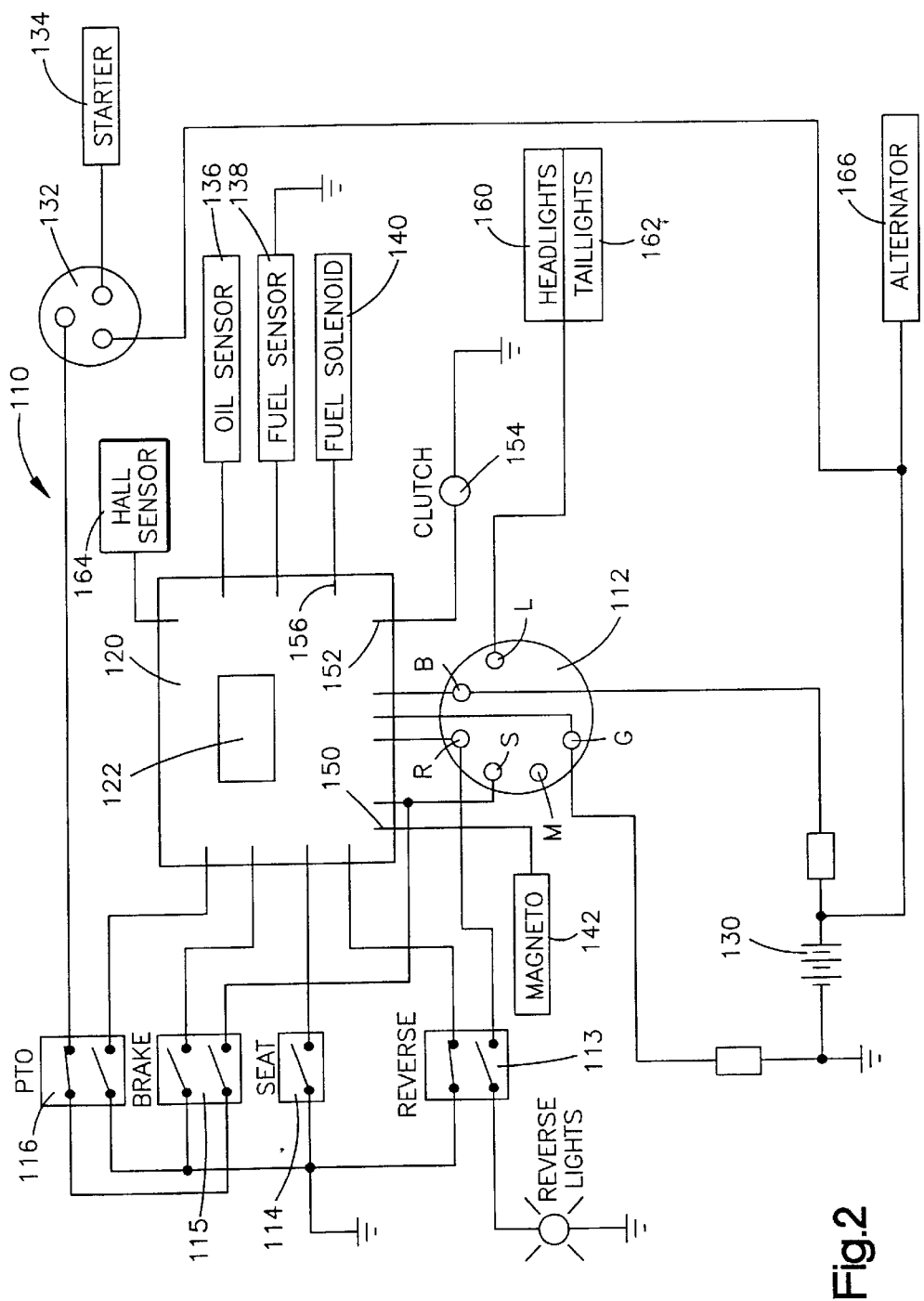
FIGS. 2 and 2A are block diagrams of alternate exemplary embodiments of a control system for use with the present invention.

FIG. 2 is a block diagram of an exemplary control system 110 which is also mounted to the tractor frame or body in close proximity to the control panel 10. The control system 110 monitors a status or state of a number of switches 112–116 that are electrically coupled to a control unit or controller 120. These switches are the ignition switch 112, a reverse switch 113 coupled to an operator actuated shift lever, a seat switch 114 that is changes state when an operator sits on the mower seat 22, a brake pedal switch 115 and a power take off switch 116 that is lever actuated by the user to engage the lawn mower blades.

In addition to monitoring the status of the switches 112–116, the controller 120 updates a liquid crystal display 122 that is visible to the operator to transmit information to the operator during operation of the mower.

As seen in the FIG. 2 block diagram, the controller 120 is powered by a battery 130 that provides power to the controller 120 at all times. The ignition switch 112 is a rotary switch having multiple contacts that is rotated by the operator to a start orientation to start the lawn mower engine. The ignition switch 112 is also coupled to the battery 130 so that when the user switches the ignition switch to a start position battery voltage is coupled to a start contact of the switch 112. When the brake switch 115 and PTO switch 116 are closed, the battery voltage is coupled from the start contact S to the starter coil 132. The starter coil 132 supplies a stepped up current to a lawn mower starter 134.

In addition to monitoring the status of various switches, the controller 120 also monitors signals from sensors such as an oil pressure sensor 136 and a fuel level sensor 138.

The lawn mower 14 depicted in FIG. 1 includes a gasoline operated engine. In an instance of a gasoline powered engine, the delivery of gasoline is controlled by an electrically operated solenoid 140 that opens and closes a valve through which gasoline is delivered from a fuel tank to the engine. Explosion of gasoline in a cylinder is initiated by a magneto 142 which creates a spark within the cylinder at periodic intervals. Starting of the engine and continued operation is possible only when an energized end of the magneto coil is not grounded by the controller 120. The present invention can be used with both a single cylinder and a two cylinder engine. Timing of the spark to the cylinder or cylinders is controlled by a signal that is based on rotation of an engine cam shaft or an electronic ignition module.

Starting the engine as well as monitoring the status of the lawn mower is performed under the control of the controller 120 to assure all safety conditions for allowing starting and continued operation of the lawn mower are satisfied.

Overview of Control of lawn mower operation

The exemplary embodiment of the present invention maintains control over starting and continued operation electronically through a sensing of the status of the lawn mower and output controls signals from the controller 120. An interface circuit on a printed circuit board that includes the controller 120 provides an interface for signals between the controller and the magneto. The interface circuit enables the controller 120 to ground a magneto output 150. Thus, an output from the controller allows the controller 120 to shut off the engine in response to sensing of an unsafe condition as well as inhibit starting of the engine.

In one embodiment, an interface circuit from the controller includes a photo-triac coupled to the controller, ground and the magneto output 150. The infrared LED (emitter side) of the photo-triac is connected between the controller and ground. The photo-triac (receiver side) is connected between ground and the magneto output 150. To ground the magneto output 150, the controller turns on the infrared LED (emitter side) of the photo-triac which creates a path from the magneto output 150 through the photo-triac (receiver side) to ground.

Use of a programmable controller 120 to short a magneto coil is in contrast to a technique disclosed in issued U.S. Pat. No. 5,190,019 to Harvey which is assigned to the assignee of the present invention and incorporated herein by reference.

Figure 2A:
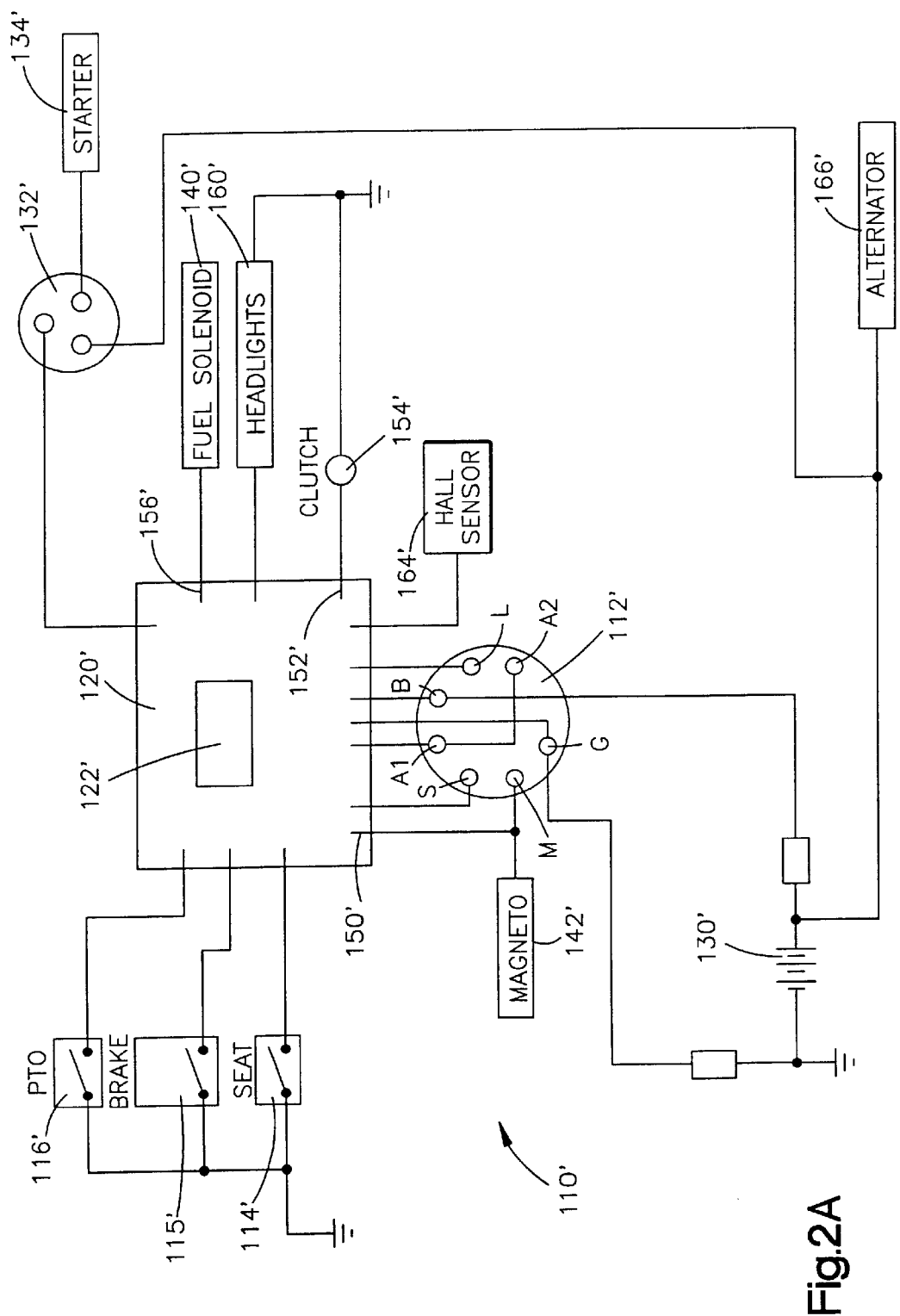

In the exemplary embodiment of the invention, the starter motor 134 is coupled to an output from the PTO switch 116 which is in turn coupled to the brake switch 115 which in turn is coupled to the ignition switch 112. This arrangement allows the engine to start only when the power take off is disengaged and the brake is engaged. As an alternate embodiment depicted in FIG. 2A, the PTO and Brake switches could be single pole switches and starter operation could be controlled through an output from a controller 120' exclusively. In FIG. 2A the reference characters have been appended with a prime (') designation to distinguish these from the reference characters of FIG. 2.

In one embodiment, an additional control output or interface 152 is used by the controller 120 to actuate an electronic clutch 154. In one exemplary embodiment of the invention, this control output is used to control engagement of the lawnmower PTO output (which is commonly attached to blades, at snow auger etc) and more particularly can be used to inhibit engagement of the PTO output in response to a sensed unsafe condition. Additionally the illustrated controller 120 has an output or interface 156 coupled to the fuel solenoid 140. This allows the controller to redundantly inhibit operation of the lawnmower in response to sensing of an unsafe condition. The controller can disrupt delivery of fuel to the engine by closing a fuel valve that is controlled by the solenoid 140.

Figure 14:
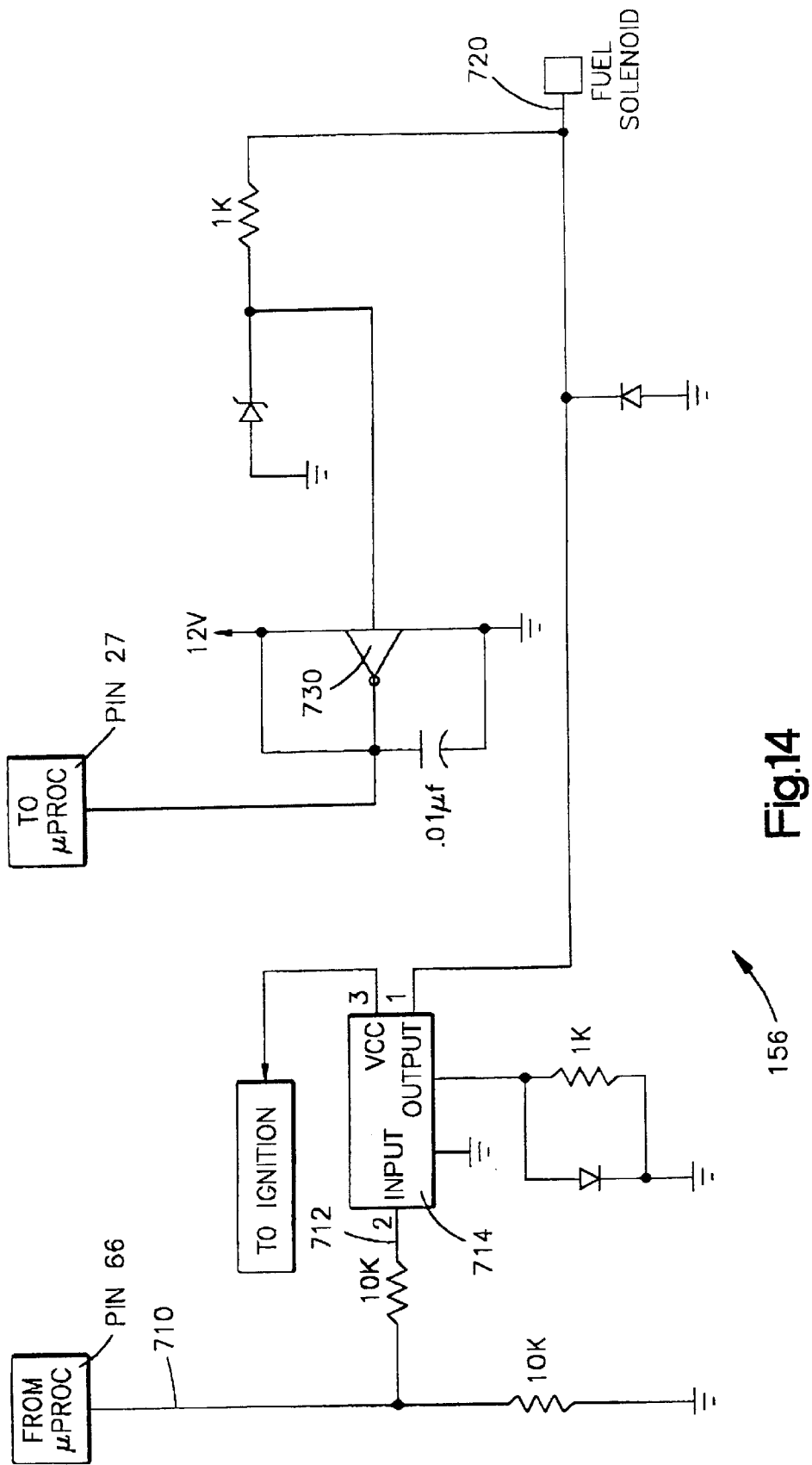
FIG. 14 is a partial schematic showing an interface between a controller and a fuel solenoid output.

A representative interface circuit 156 for controlling the fuel solenoid 140 is depicted in FIG. 14. An input 710 to the circuit 156 is coupled to the controller 120. When the output from the controller 120 is high, the high signal is input to an input pin 712 to a smart FET circuit (model VN820 from ST micro) 714. This high input causes the FET to conduct and couple twelve volt battery input from the ignition to an output 720. The twelve volt signal is fed back to the microprocessor controller 120 by means of an inverter amplifier 730. A zener diode 732 coupled to the output 720 reduces the twelve volt battery signal to five volts. This five volt signal is inverted and fed back to the controller 120 to allow the controller to confirm that the output to the solenoid went high in response to a control signal at the output 710. In the representative embodiment of the invention a high signal at the output 720 opens a fuel valve to deliver fuel to the lawn mower engine.

As seen in FIG. 2 in the disclosed embodiment of the invention, the ignition switch 112 controls the lawn mower headlamps 160 and tail lamps 162. In the alternate embodiment of the control system 110' shown in FIG. 2A, the controller 120' controls the lamp circuit so that the headlamps are maintained on for a certain time period after the engine is shut off. This feature also enables the controller 120' to turn off the lamps if the engine is not running even though the operator to does not toggle the headlamp switch to turn off the lights.

Convenience features and Communication.

The disclosed exemplary controller 120 has a number of options for activating and updating the LCD display 122. The controller maintains an hour meter that, in accordance with one embodiment of the invention, is updated so long as the controller is not operating in a so-called sleep mode. A more sophisticated and presently preferred embodiment of the invention updates the hour meter based on sensed operation when the lawn mower engine is running. The monitoring of a sleep mode condition might be an option for use with a less expensive version of a controller operating system.

A tachometer function is achieved by counting pulses that are generated during operation of the lawnmower. The pulses are used to determine engine speed. The controller also monitors lawn mower ground speed. This is accomplished by an input from a hall effect sensor 164 that is mounted near a lawn mower axle for monitoring rotation of the wheels. By monitoring the combination of lawn mower ground speed and engine speed, the controller 120 can present an indication on the LCD display 122 that tells the operator whether or not the cutting blade is rotating at an efficient rate. In accordance with one embodiment of the invention a green LED 165a that is located on the display 122 is illuminated when efficient cutting occurs and a red LED 165b is illuminated when the ground speed is too fast or too slow for efficient cutting to occur.

The exemplary controller 120 monitors the status of a seat switch 114 that opens and closes depending on whether the seat is occupied. A seat switch time delay feature is implemented to allow the engine to continue operating even though there is an intermittent or temporary opening of the seat switch. This assures that an operator bouncing up and down on the seat will not turn off the engine in an inappropriate way.

The programmable controller 120 displays a custom power up message on the LCD display 122. This allows a local dealer who sells and services lawn and garden equipment, for example, to program in certain information relating to his or her business which will be visible to the operator subsequent to display of a maintenance reminder on the LCD display 122. As an alternative, such unique dealer information can be displayed for a short time interval subsequent to actuation of the ignition key switch to the run or the start position. Thus, a telephone number of the dealer and any other messages unique to the dealer could be displayed briefly each time the riding lawnmower is started.
Reliability, Diagnostics When the operator toggles the ignition switch from the off position to the run or start position the controller 120 is programmed to convey specified fault messages to the operator. The controller performs start solenoid coil diagnostics by interrogating the state of the coil prior to starting the engine.

The control system 110 interfaces with a tester or module 111 that is pin compatible with a wiring harness H used to connect the switches and sensors to the controller 120 in the illustrated embodiment of the control system 110. Stated another way, the tester or module is utilized by disconnecting the wiring harness coupled to the controller 120 and plugging the harness of the tester or module into the control system 110 to couple the tester or module to the controller 120.

The tester or module interfaces with the control system 110 and provides a number of features. One of the features this module provides is an ability to reprogram the controller at a subsequent date. Additionally, the module can be used for testing functionality of the controller and providing diagnostic output during maintenance. Additionally, this module can download updated messages for display on the LCD display 122.

The controller 120 provides maintenance reminders at periodic intervals that are related to the hour meter operation of the control module described below. The programmable controller 120 also provides a warning in the event of a failure in a charging circuit. The charging circuit warning is provided when the battery is not being properly charged by an alternator 166 as the engine is running. A separate low battery sense feature senses battery voltage levels when the engine is not running and provides an indication to the user on the LCD 122 that the battery 130 should be charged.

Figure 13:
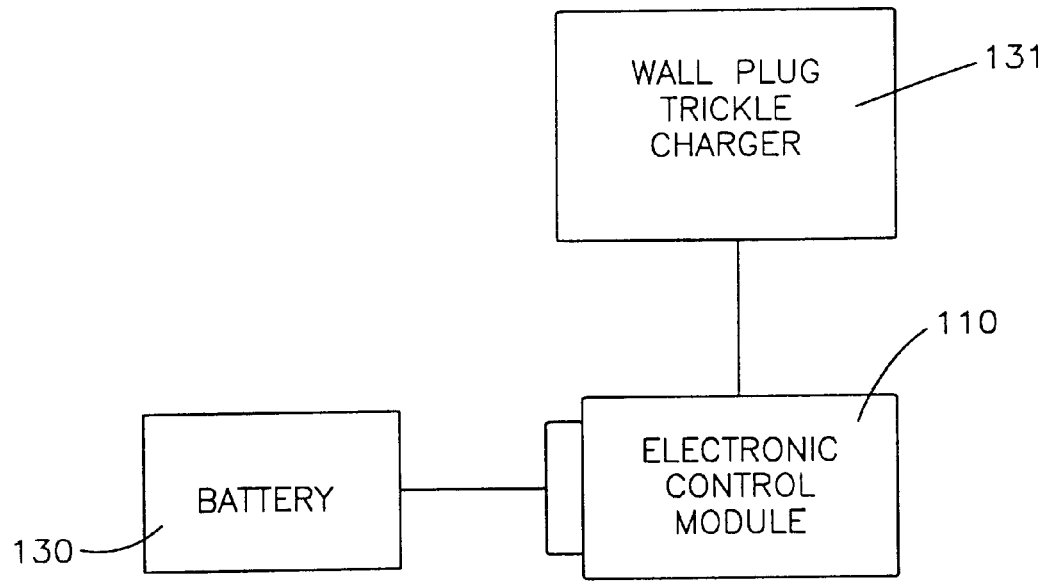
FIG. 13 is a block diagram of an exemplary control system coupled to a charger for charging a battery.

FIG. 13 is a block diagram showing a configuration of the present invention for use with a trickle charger 131 used to charge the battery 130. When in use the control system 110 monitors a battery voltage output from the battery 130 and connects the trickle charger 131 to the battery when the voltage level falls below a threshold. The control system 110 also disconnects the trickle charger from the battery when the voltage level is equal to or greater than the same threshold. The control system 110 includes an interface into which the trickle charger would engage and thereby avoid a connection between the trickle charger 131 and the battery.

The controller 120 also monitors the total number of on/off cycles for the various switches in the system. The controller 120 alerts the operator when certain safety operating characteristics have not been satisfied and under certain circumstances completely disables the mower. If a large number of on/off cycles have been experienced for the brake and a much smaller and inappropriate number of on/off cycles for the seat switch have been experienced, it is possible that the seat switch has been disabled by the user. The controller can disable or simply provide a warning under these circumstances. Additionally, these switch cycle counts are stored in an EEPROM memory and are available for examination during maintenance.

In a so called sleep mode, power consumed by the controller 120 is reduced so that during the winter, for example, battery life is preserved. In sleep mode the control system 110 consumes approximately 50 microamps when during normal operation it consumes 50 milliamps.

Figure 11A:
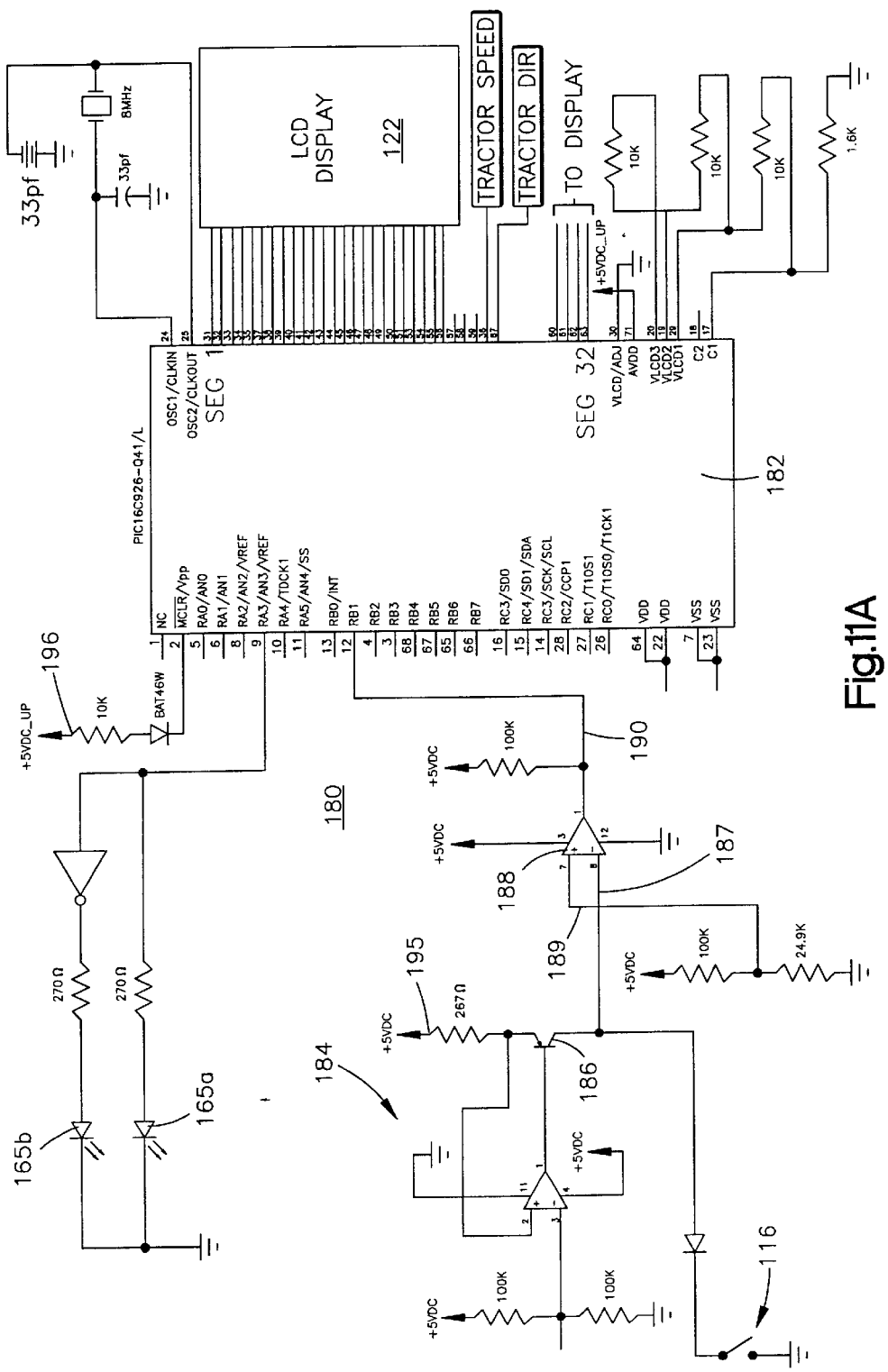
FIGS. 11A and 11B are partial schematics of a controller constructed in accordance with the invention and circuitry attached to a controller circuit board.

As noted previously, the controller 120 provides the operator with information regarding the low battery and prompts the user to charge the battery. A monthly battery check with audible chime feature periodically checks the battery voltage level with an audible indication to the user that the battery status is acceptable.
Other features To compensate for dirty switches, the controller 120 provides a constant current signal to the switch and then monitors the voltage drop across the switch. The open or closed resistance for a dirty switch may cause the controller to sense a different voltage across the switch than the voltage for a clean switch. Circuitry coupled to a printed circuit board 180 is seen in the schematic diagram of FIG. 11A. The board supports a microprocessor 182 that includes I/O ports for interfacing with other discrete components mounted to the board 180. One portion of an interface circuit 184 is coupled to the PTO switch 116 for engaging the mowing blades of the tractor 14. A constant current source in the form of a transistor 186 is coupled to one side of the PTO switch contact and the other side of the switch is grounded. A voltage is developed across the switch contacts when the switch is both opened and when it is closed. The voltage is coupled to an input 187 of a comparator 188 having a reference input 189. The comparator provides a digital output 190 that the microprocessor reads to determine switch status. The amplifier responds appropriately to a range of voltage values that can change within this range based on the cleanliness of the switch contacts. As noted above in certain embodiments, such as the embodiment of FIG. 2A, the switch wiring harness is simplified since there are only two wires to each of the switches.

The exemplary controller is designed to be compatible with different types of gasoline engines used on different types of lawn and garden tractors. The controller 120 implements a universal engine sensing feature which allows this system to work, for example, based on the polarity and/or timing of the magneto signal coupled to the controller by the interface 150.

In accordance with an exemplary embodiment of the invention, during a diagnostics mode of operation, the controller may confirm that there is a problem and a message can be output to the user to reset the controller. The ignition switch 112 used with a typical lawn and garden tractor is a key switch that fits into a slot in the dashboard. The key is rotated to a desired orientation to start the engine. In accordance with an exemplary embodiment of the invention, the key for the ignition switch includes a magnet molded into the body of the ignition key. In response to receipt of a reset prompt, the operator moves the key including the magnet next to a pad 170 (FIG. 1) on the control panel. The magnet will activate a reset switch that causes the controller 120 to reset monitored variables.

conserves battery power. The sleep mode is entered if the engine has not been running for thirty seconds.

The disclosed controller 120 executes a control program that performs tasks that depend on the status of variables stored in the memory of the controller. Some of the variables are status bytes made up of status bits that are either on or off. Other variables found in the flowcharts described below are entire bytes that are used to store text. Other variables act as counters that are incremented during performance of the controller implemented control process.

Table 1 lists certain status variable names as well as the meaning of those variables that are accessed during execution of controller operating system. These status variables are generally used in making branch decisions during execution of the controller operating system.

TABLE 1

| Name | bit 7 | bit 6 | bit 5 | bit 4 | bit 3 | bit 2 | bit 1 | bit 0 |
|---|---|---|---|---|---|---|---|---|
| sys_fl0 (flag 0) | PTO on | Low Oil | Low Fuel | Charge Low | Battery Low | maint reminder blades | Diagnostics | engine running |
| sys_fl1 (flag 1) | | In sleep mode | blades are on | start in progress | engine single | engine twin | maint reminder oil | Dealer interface |
| CCP1 | | | $3^{rd}$ mag pulse seen | $2^{nd}$ mag pulse seen | $1^{st}$ mag pulse seen | engine type determined | tach ready | mag pulse seen |
| saf_mdl | clutch control lost | fuel sol control lost | blades off latch bit | turn off delay bit | start attempt taking place | 2 sec timer after start does hi to low | start did a high to low trans | start did a lo to high trans |
| db0 db0_temp db_DN | | | start start temp valid | Reverse reverse temp Valid | brake brake temp valid | seat seat temp valid | pto pto temp valid | |
| LCD_hr 1 | scroll PTO engaged | diag start | diag brake | diag seat | diag pto | diag reverse | start with brake off | start with pto on |
| LCD_hr 2 | power up mess | change oil | sharpen blades | check charge | low battery | hourmeter | tach | Blank LCD |
| LCD_hr 3 | | | text mode | clutch control lost | fuel sol control lost | Dealer interface message | Low fuel | low oil |
| LCD_hr 4 | | | | | Test over | Diagnostics mode | Good night | |
| ISR0_0 | | | Save PTO to EE | Save Seat to EE | Save Brake to EE | Save Reverse to EE | Save Start to EE | |

The exemplary embodiment of the invention has a switch 114 mounted to the seat for sensing a presence of a user on the seat. In an alternate embodiment of the invention the control panel 10 supports an optical sensor 172 (FIG. 1) mounted to the control panel 10 for monitoring a presence of the user on the seat.

Flowchart

Figure 3:
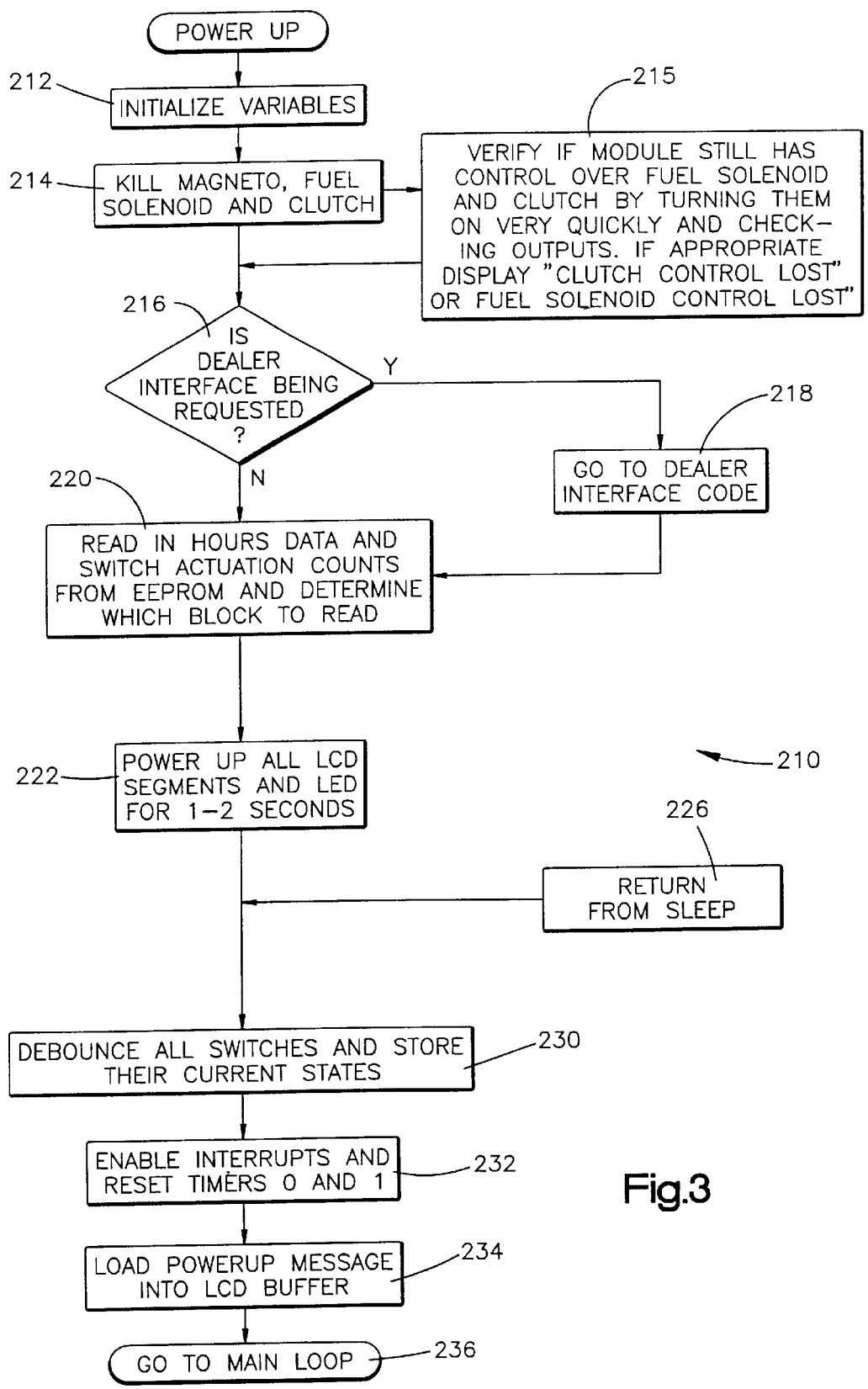
FIG. 3 is a flow chart that illustrates a power up routine for a programmable controller used in conjunction with an exemplary embodiment of the present invention.

The Figures illustrate flow diagrams indicating a control logic of a controller operating system. A power up process 210 (FIG. 3) is performed each time the battery 130 is coupled to the controller 120. Note, the battery input to the controller 120 is not switched as the ignition switch position changes so that the battery is always supplying power to the controller 120 so long as the wiring harness is connected to the control system 110. A first step in the power up process 210 is an initialization 212 of variables by the controller. The exemplary controller is an eight bit programmable controller that executes an operating system that is stored in eight kilobytes of memory and is commercially available from Microchip. The controller 120 has storage registers for maintaining variables so long as power is applied to the controller. The controller 120 also interfaces with an EEPROM memory portion that stores variables even when power is removed from the controller. During operation of the controller, when the lawn mower engine is not running, the controller may enter a so called 'sleep' mode which Returning to the flowchart in FIG. 3, after the variables are initialized 212, the controller performs a step 214 that grounds the magneto, disables the clutch, and disrupts delivery of fuel to the engine. The controller 120 then confirms 215 this step has resulted in the desired status of the controller ouputs. If it has not the LCD is updated to warn that control over these functions has been lost. The controller next determines 216 if a specific dealer interface is included in the version of the operating system and if it is, the controller 120 accesses 218 the code that activates a message on the LCD display 122 corresponding to a specific dealer.

The controller 120 next reads 220 data from an EEPROM portion of controller memory relating to the hours of operation of the mower and the switch actuation count data. The controller 120 next powers up 222 all liquid crystal display segments for a short duration. The power up routine 210 performs a step 230 that debounces switch inputs and stores their present status in a variable SW1. The debounce step is performed by a routine depicted in FIG. 7. Controller interrupts are next enabled 232 and timers 0 and 1 are reset. A power up message is loaded 234 into an LCD buffer and a jump 236 to a main processing loop is conducted.

Main Processing Loop

Figure 4:
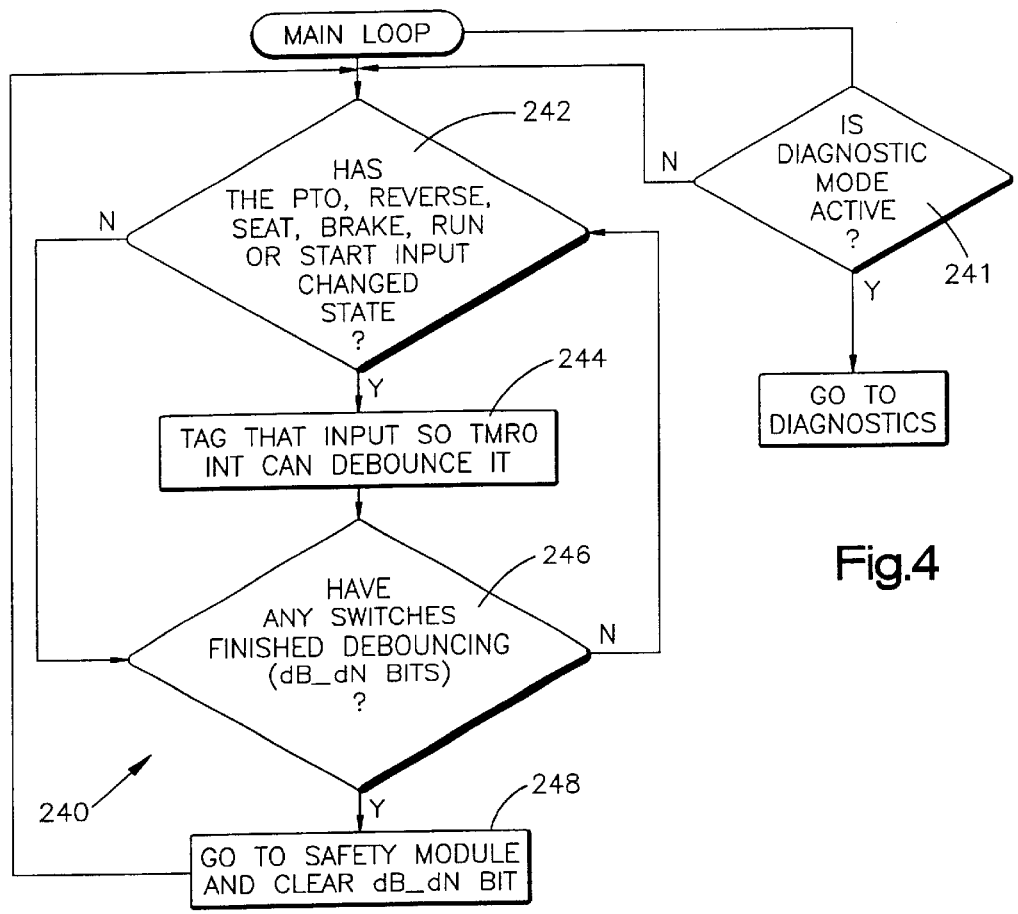
FIG. 4 is a flow chart of a main processing loop that is performed by the programmable controller in an exemplary embodiment of the invention.

A flowchart of the main processing loop 240 of the controller is depicted in FIG. 4. The first step of this routine 241 is to check and see if a diagnostics mode is enabled. If it is, a branch is made to perform the steps disclosed in the diagnostic routine 400 of FIG. 6. The user puts the controller in diagnostics mode by toggling the ignition switch to the run position off and on for three consecutive times within a two second interval.

Figure 6:
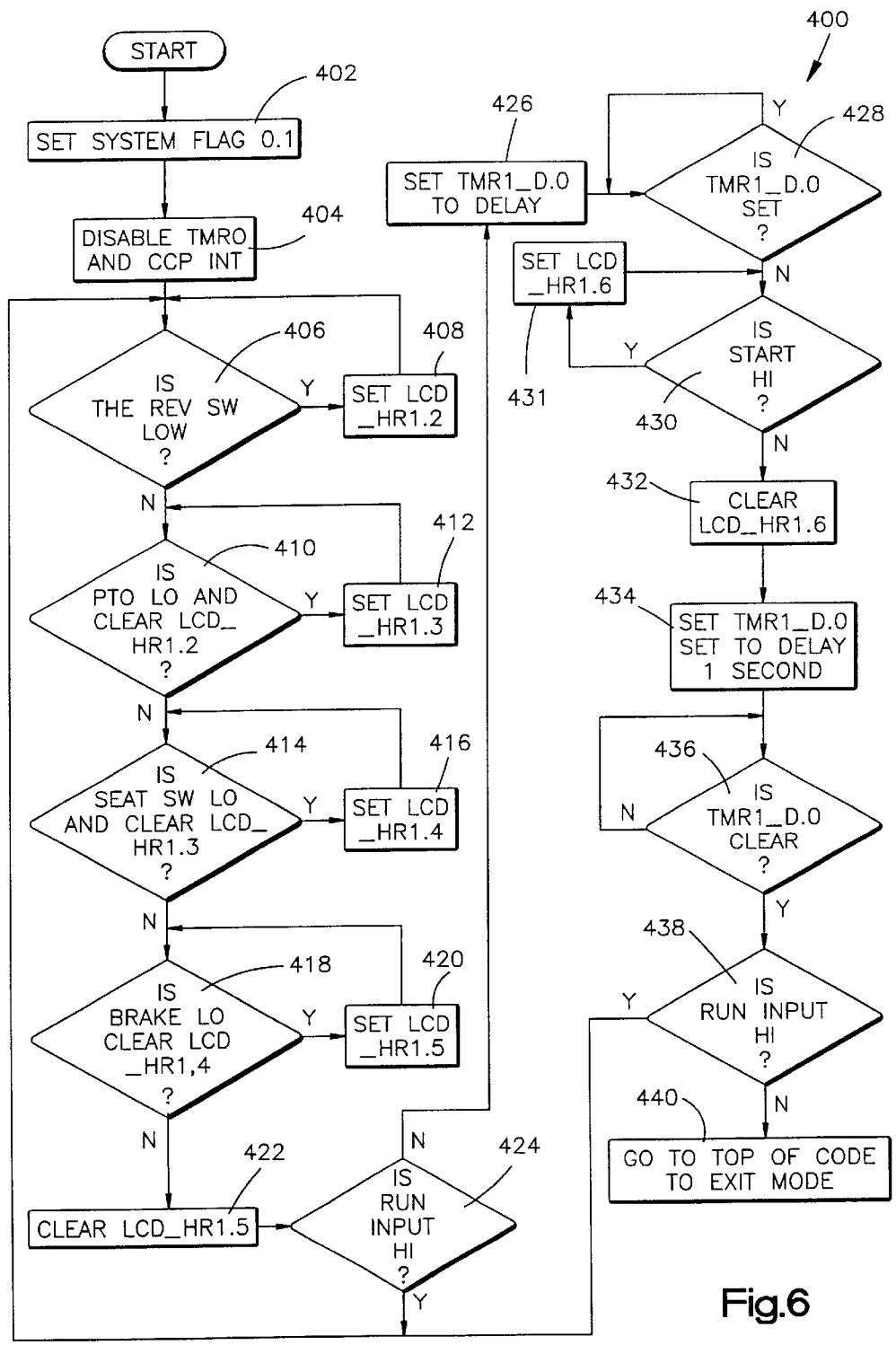
FIG. 6 is a flowchart of a diagnostic module for use with an exemplary operating system.

The diagnostics process 400 of FIG. 6 begins by a step 402 of setting a diagnostics bit (sys_f10.1) and disabling 404 two interrupt processing routines that are discussed below. The diagnostics process 400 next enters a series of tests that determine the status of different switches. The diagnostics routine is typically performed by a technician working on the lawn mower or tractor. If the tractor shift lever is put into reverse, an input to the controller 120 from the reverse switch 113 changes to a low state (low resistance) and this is sensed by the controller. If this reverse switch setting is sensed a bit (LCD_HR1.2) is set 408 by the controller and this causes a message to be displayed on the LCD display 122 on the execution of a TMR1 processing routine depicted in FIGS. 9 and 9A. If the reverse switch is not closed, the controller then checks 410 a status of a power take off (PTO) switch 116 and clears the LCD_HR1.2 bit. If the PTO switch input is low, the bit LCD_HR1.3 is set 412 and the processor loops until the PTO switch is no longer low. Again, the TMR1 processing routine is responsible for sensing the bit status and updating the LCD display 122. The processor steps 414, 416, 418, 420, 422 check the status of the seat switch 114 and the brake switch 115 to allow the TMR1 interrupt to update the display 122 in response to actuation of those switches.

The step 422 clears the bit (LCD_HR1.5) corresponding to the brake switch low state and branches to a step 424 where the controller checks to see if the ignition switch 112 is in the run position. If the switch is in the run position, the ignition switch has coupled the battery voltage across a run contact on the ignition switch so that when in the run position, the controller senses a high signal. This causes the controller to branch back to a test 406 of the reverse switch. The diagnostics mode is entered by toggling between the run and the off position of the ignition switch three times. To enter diagnostics the switch will be in the run position. To test the ignition switch the user must then switch the switch to the start position which causes the run input from the switch 112 to go low.

If the run position input is low, a bit is set 426 to initiate a one second delay by the TMR1 interrupt processing routine and a branch is taken to a test 428 to determine if the one second has elapsed. During this one second delay, the technician can toggle the ignition switch to a start position to test functioning of the ignition switch. A next step determines 430 if the start input from the ignition switch is high. If it is, the controller sets 431 a bit causing the TMR1 interrupt routine to update the display 122. When the start input goes low in response to the technician moving the ignition switch, a bit is cleared 432 and another one second delay is instituted by setting 434 a bit. The controller 120 delays 436 or waits one second as controlled by the TMR1 interrupt. This delay allows the user to move the switch to the run or the off position. If the controller determines 438 the user has moved the ignition switch to the run position, the controller branches to test the status of the other switches at the step 406. If the ignition is moved to an off position, the controller exits 440 the diagnostics routine to return to the main processing loop.

Referring again to FIG. 4, as a next step the processing loop determines 242 whether any of the switches 112–116 has changed state. This is done by comparing the state of the stored switch status bytes SW1 with the sensed status of the switches in SW2. This is performed by poling the switch states by means of an interface for each of the switches. More particularly, the voltage drop across the switch is determined. If there is a difference between the stored value of a switch in SW1 and the presently sensed status in SW2, this switch input is tagged 244 (stored in db0) so that an interrupt processing routine can debounce that input. As this is being done, the state of SW1 is maintained so that its status is not changed until its state is determined to be stable. An illustrative debounce process 250 is summarized in the flow chart of FIG. 7 which is called on power up of the controller as well as by the interrupt process routine in FIG. 9.

Figure 7:
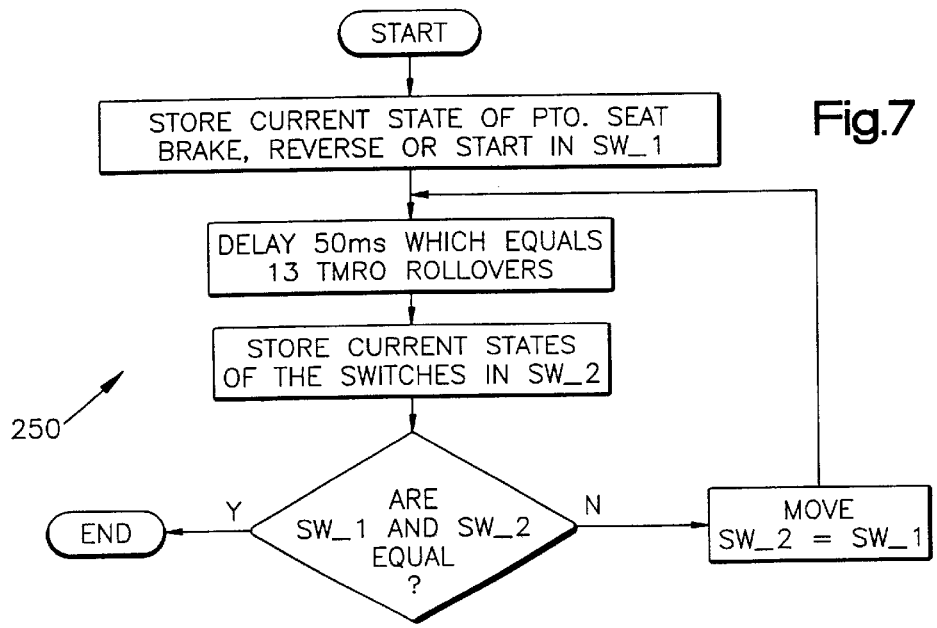
FIG. 7 is a flowchart of a debounce module for use with an exemplary operating system.
Figure 5A:
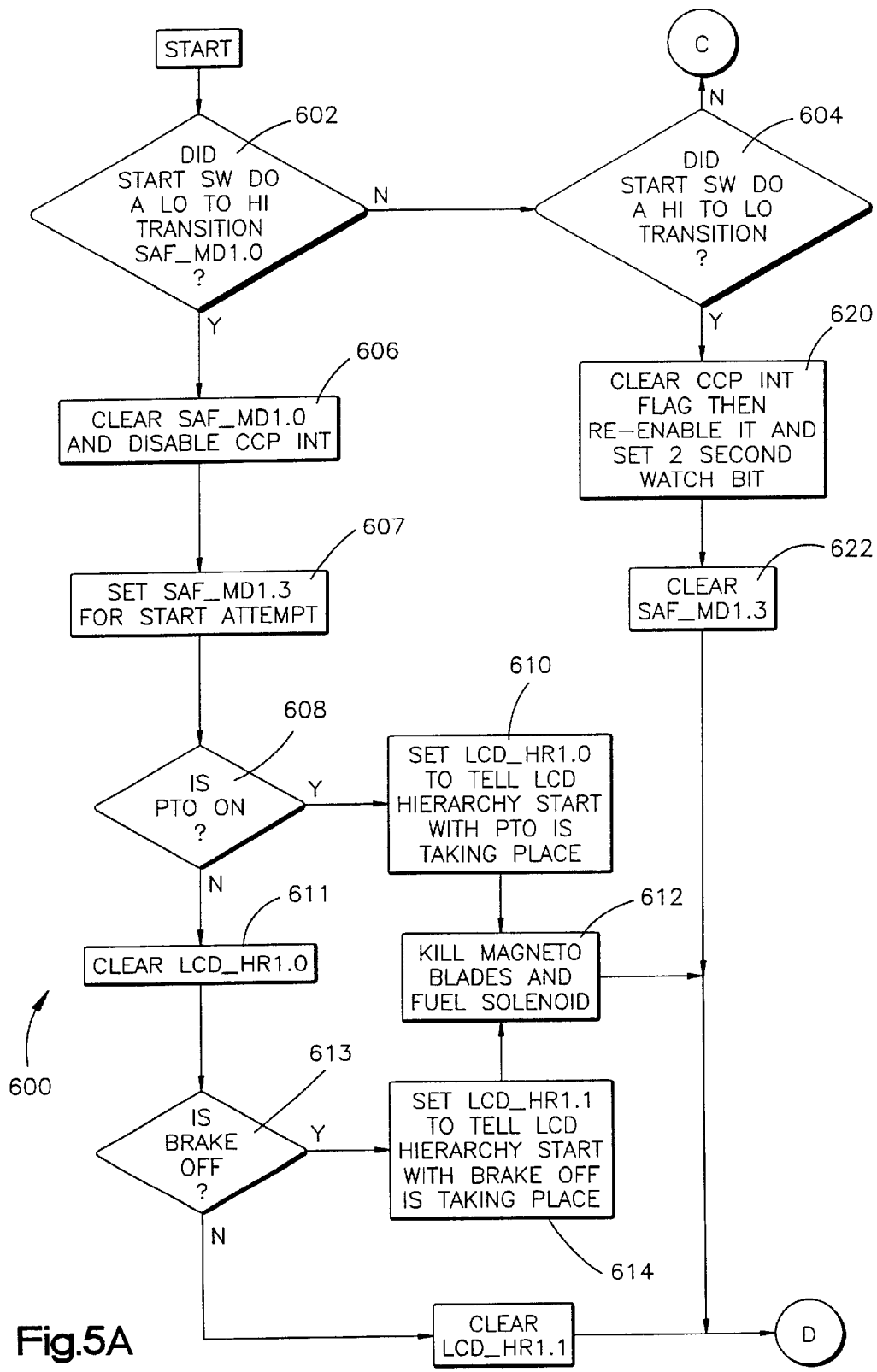
FIGS. 5A, 5B and 5C are flowcharts of a safety control module for use with an exemplary operating system.
Figure 5B:
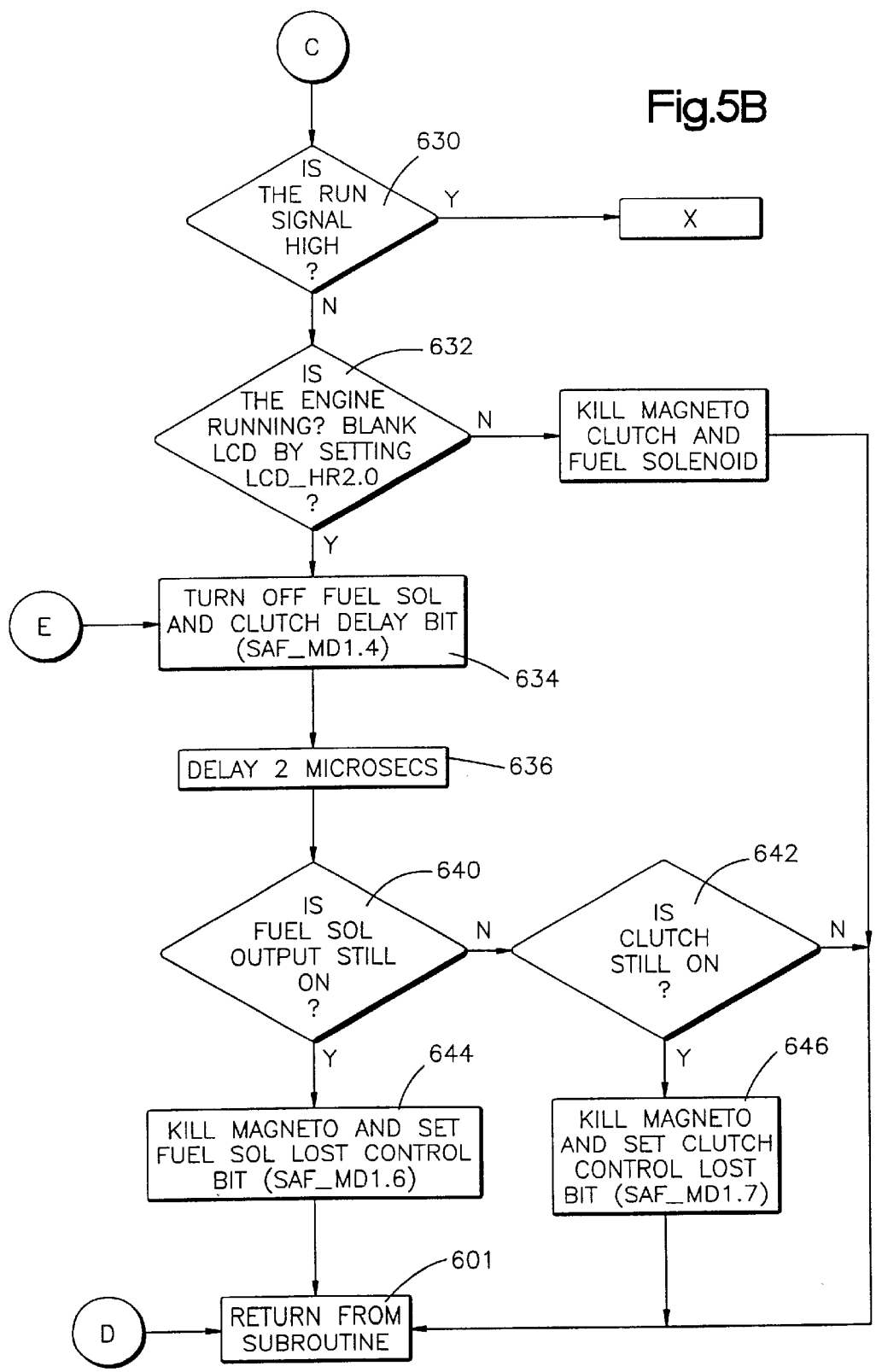
Figure 5C:
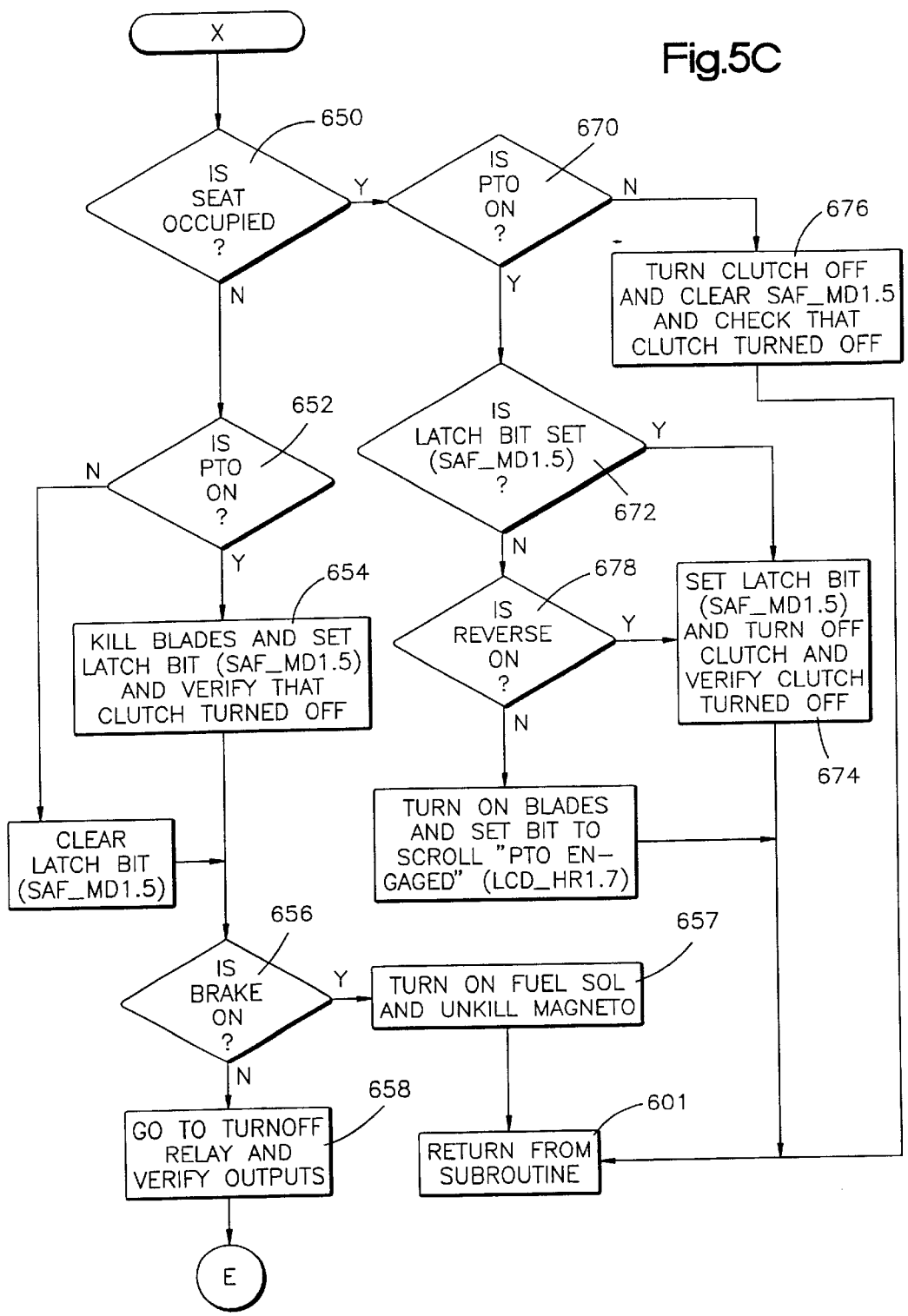

The FIG. 7 debounce process checks the status of the monitored switches, waits approximately 50 milliseconds and then checks the switch status again. If the switch status is the same after this delay, the switch has safely been debounced and confirmed to have a valid state. If a stable switch status has not been confirmed, then the debouncing continues until a stable switch status has been confirmed. A stable switch status is confirmed by the main processing loop 240 at the step 246 by checking the state of the db_DN bits (debounce done) of the variable db_DN (see table 1). The main processing loop process 240 sits in a loop awaiting a successful debouncing of a switch that has changed state. Once such a transition occurs, the controller 120 branches 248 to processes depicted in FIGS. 5A, 5B, and 5C for determining whether safe continued operation of the engine is possible. When the main processing routine returns from these safety status checks, it loops back to a step 242 of checking to see if any of the switch states have changed. The safety status check routine is depicted in FIGS. 5A, 5B and 5C and is described below.

Controller Interrupts

The controller 120 includes two internal controller generated timers TMR0 and TMR1 and one externally generated hardware interrupt CCP1. One timer interrupt, TMR0 executes an interrupt service routine (ISR) (FIGS. 8, 8A, 8B) every 4 milliseconds so long as power is applied to the controller 120 and the interrupt is enabled. A second timer interrupt routine (FIG. 9) executes an interrupt service routine every 0.262 seconds that power is applied to the controller 120. The third interrupt routine (CCP FIG. 10) is performed in response to receipt of a pulse from the engine magneto 142 and that interrupt is enabled.

TMR0 ISR

Figure 8:
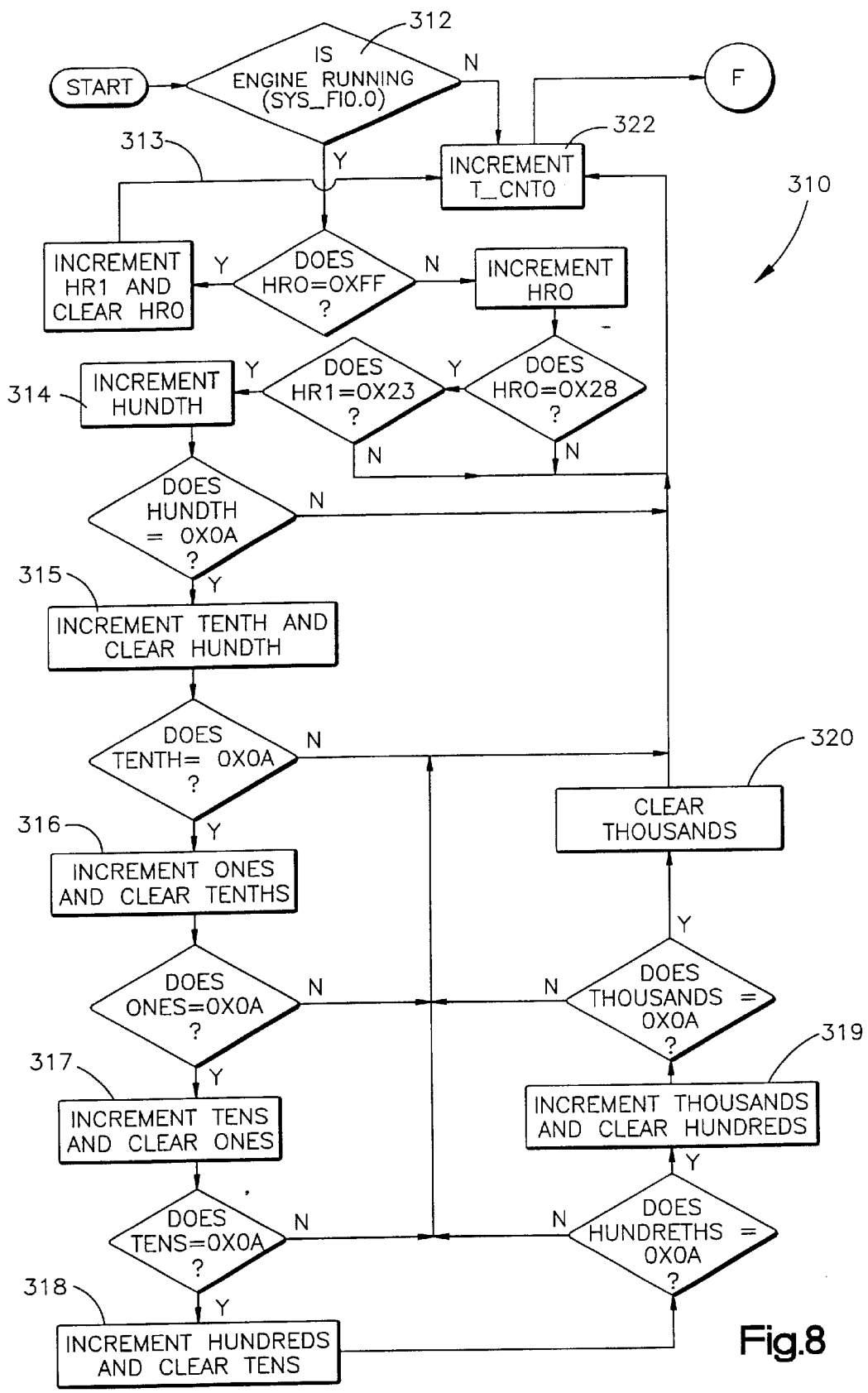
FIGS. 8, 8A, 8B, 8C, 8D, 9 and 9A are flowcharts of timer interrupt service routines for use in an exemplary embodiment of the invention.
Figure 8A:
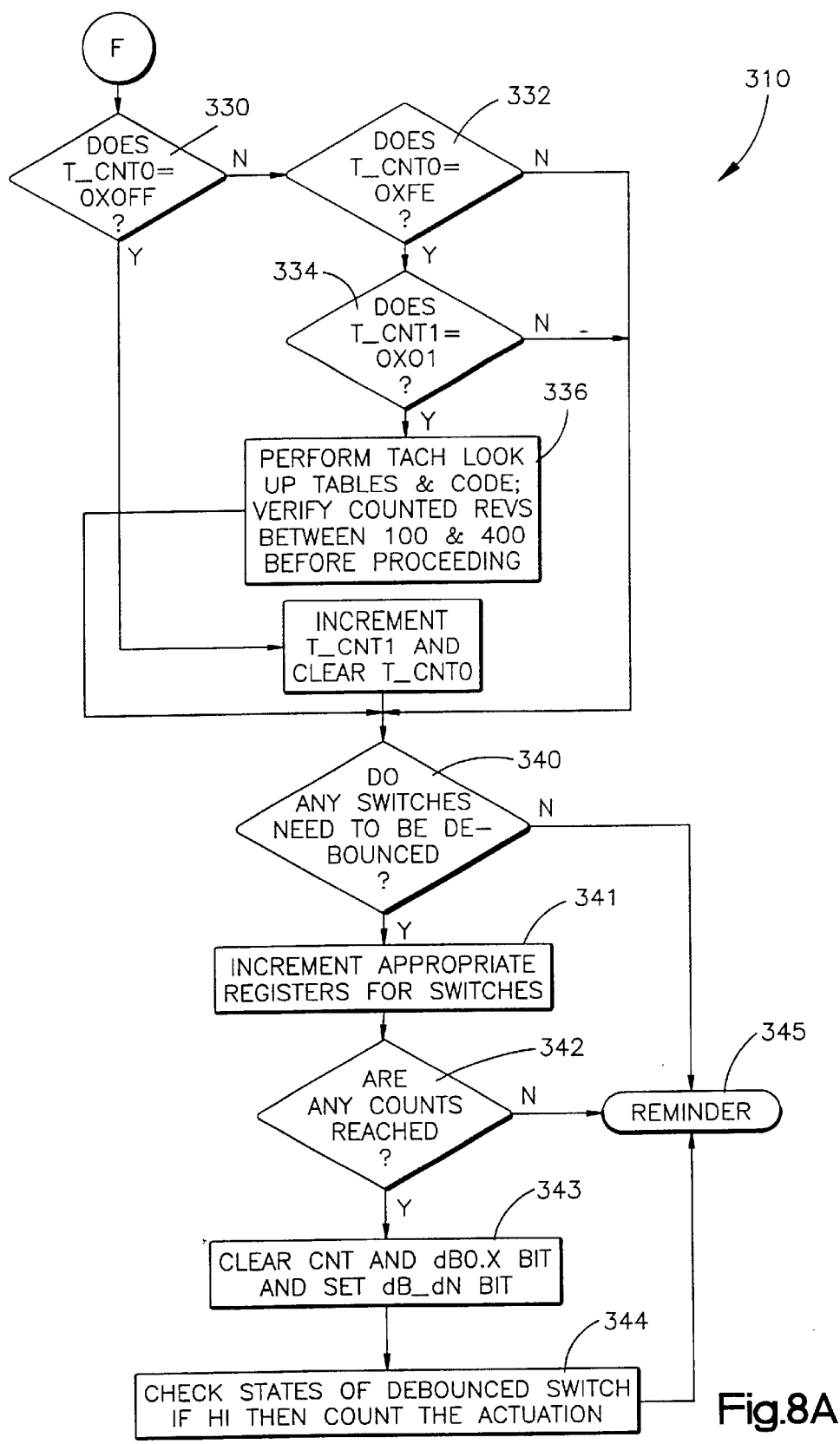
Figure 8B:
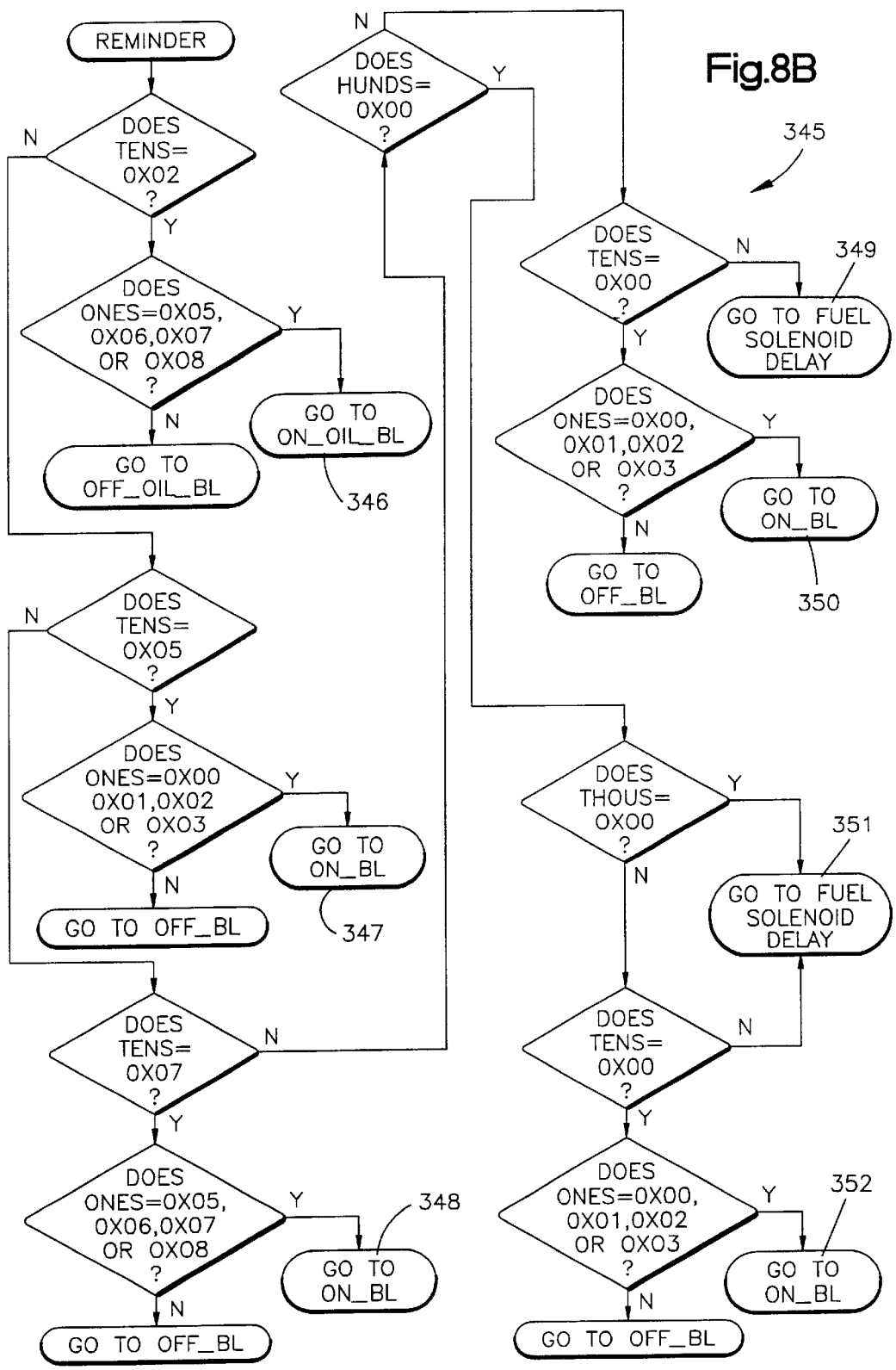

An interrupt service routine 310 for the higher rate (every 4 milliseconds) hardware interrupt (TMR0) is depicted in FIG. 8. The controller 120 includes a crystal oscillator running at 8 megahertz so that every 8000 clock pulses cause this interrupt routine to execute. This routine 310 is called after the status of the controller is pushed onto a controller stack so that the processor knows where to begin processing when the routine 310 completes.

The routine 310 initially checks 312 (FIG. 8) a status of system flag 0, bit 0 (sys_f10.0) to determine if the engine is running. This flag is set when the controller 120 has determined the engine is running by inputs from the engine magneto. If the engine is running, a branch 313 is taken and the routine 310 updates, at a sequence of steps 314–320, the status of byte size variables labeled hundredths, tenths, ones, tens, hundreds and thousands. These variables are used to update an hour meter that is presented to a user on the LCD display 122. $\frac{1}{100}$ of an hour is 36 seconds. Two byte size variables HR0 and HR1 that are incremented by the process 310 count up to 9000 (0X2328 hex) every 36 seconds to accumulate engine running time for this display. Each time 36 seconds of elapsed engine running time occurs the hour count is updated.

Figure 10:
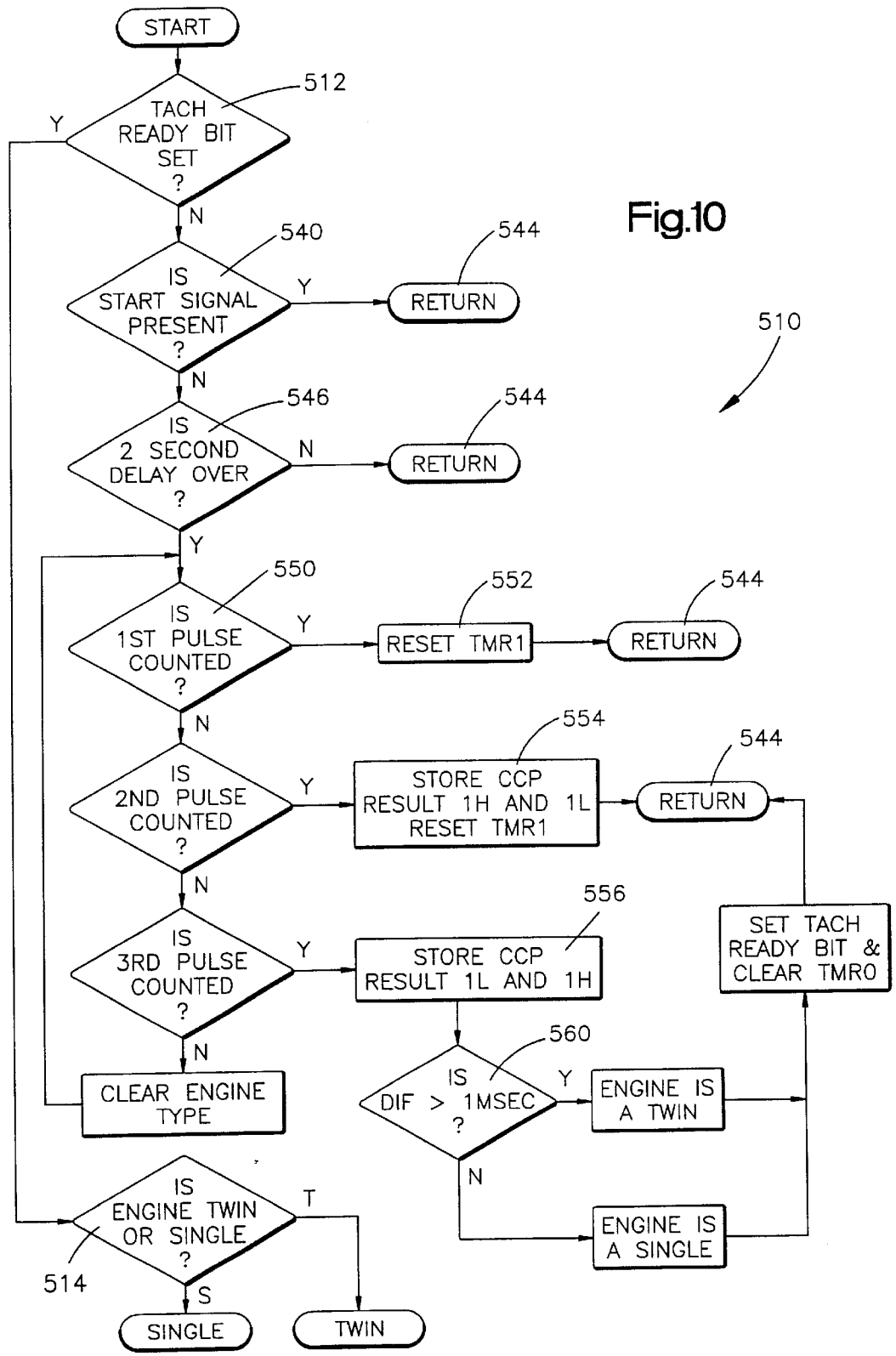
FIGS. 10, 10A and 10B are flow diagram of a hardware interrupt service routine for use in an exemplary embodiment of the present invention.
Figure 10A:
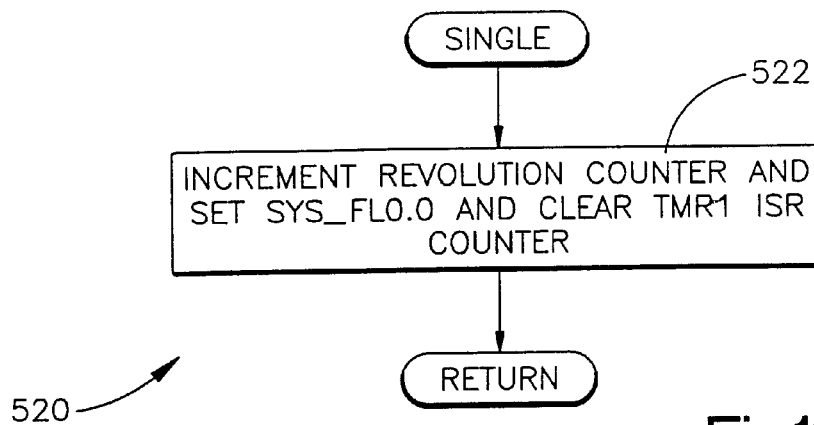

After the hour meter is updated the routine 310 performs steps to implement an engine tachometer. The tachometer function is implemented based on counting pulses that are received by the interface between the controller 120 and the magneto 142. Each time a pulse from the magneto is received at the interface, a CCP1 interrupt routine 510 summarized by the flow chart of FIGS. 10 and 10A is executed. In the processing routine 310, regardless of whether or not the engine is running, a free running counter (T_CNT0) is incremented 322 every 4 milliseconds. Turning to the top of FIG. 8A, the routine 310 makes three determinations 330, 332, 334 to see if the two counters T_CNT0 and T_CNT1 have reached the values 0XFE and 0X01 respectively. This state causes a branch to a step 336 every six seconds so long as the interrupt routine 310 is enabled. (Recall, this routine is disabled during diagnostics mode.) During this six seconds of processing, the magneto pulses are being received by the controller 120 and the pulses are converted to engine shaft revolutions. (Depending on a twin cylinder or single cylinder, more than one pulse can be received per revolution.) At the step 336 the controller confirms that the revolutions per minute (rpm) are between 100 and 400. If engine speed falls in this range, the LCD displays that rate on the display 122. If the revolutions per minute are not in that range, a zero rpm is displayed to the user indicating that the engine should be serviced. The step 336 also clears the counters T_CNT0 and T_CNT1 to institute another six second delay before branching to a step 340.

The step checks 340 to see if any switches need to be debounced. Assume they do so that a step is implemented to increment 341 appropriate registers for counting a debounce period of time. In the disclosed embodiment, the routine 310 executes every 4 milliseconds and a 50 millisecond delay takes 13 iterations. At a next step the code determines 342 if the requisite number of iterations (13) has been reached for any of the switches. If it has a branch is made to clear 343 the count for that switch and also set the db_DN bit for that switch. If the debounced switch state is high, a next step 344 increments the count of switch actuations which are stored in the variable for that switch. As an example a 24 bit variable designated PTO_CNT is updated for PTO switch activations. This variable is stored in the RAM of the processor and is also stored in an area of EEPROM so that it can be later evaluated if needed with power removed from the controller. The routine 310 then branches to a reminder routine 345 (FIG. 8B) for updating the display.

Figure 8C:
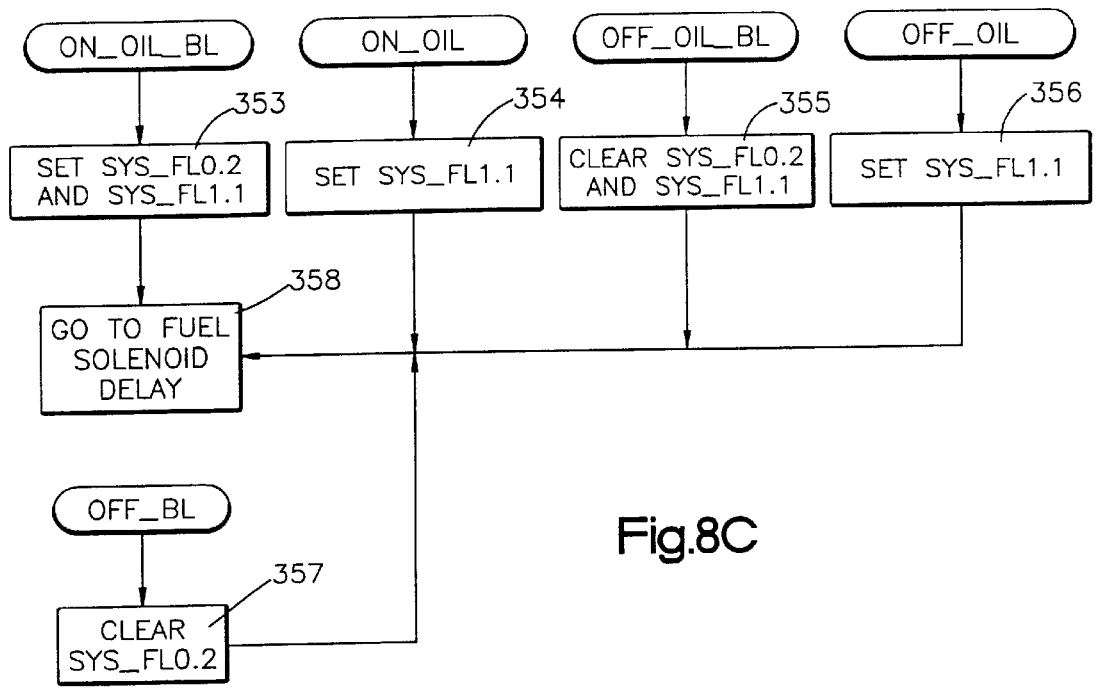

The reminder routine 345 accesses in turn variables maintained and discussed above for maintenance of the hour meter function for the display. The reminder portion of the reminder routine performs a series of checks on hour meter variables and performs appropriate branch steps 346–352 based on those determinations. The flowchart of FIG. 8C depicts how the controller 120 prompts the user that the oil needs to be changed or the blades need to be sharpened. The display is automatically updated upon the setting of the appropriate bits by these steps.

Figure 8D:
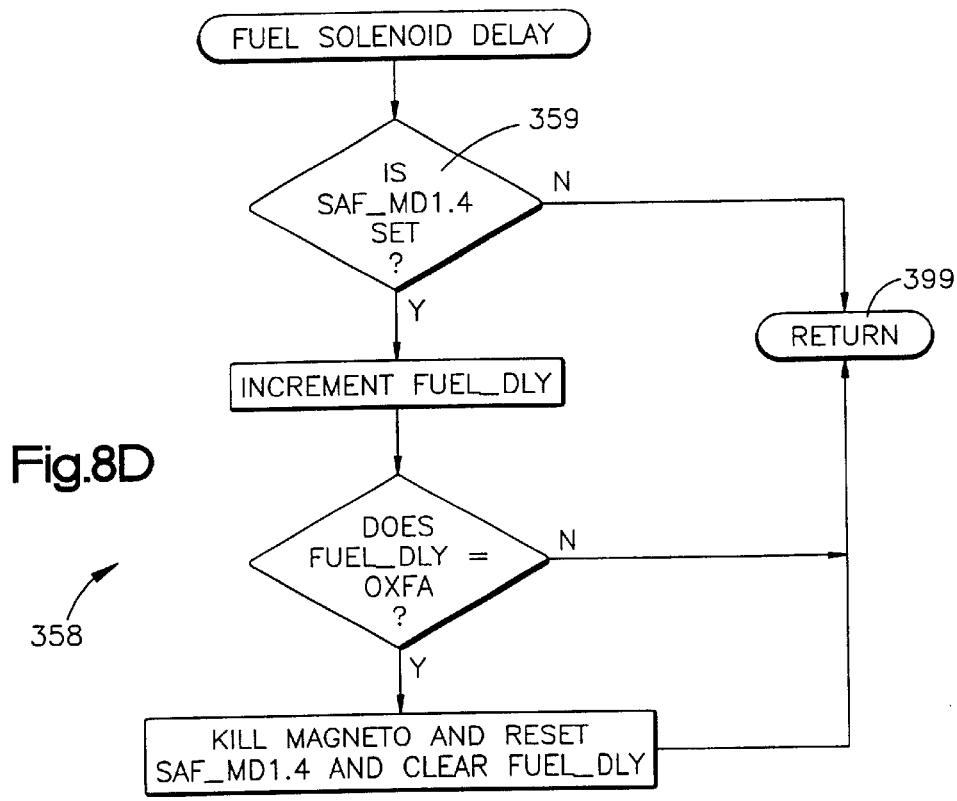

Referring to FIGS. 8C and 8D, the interrupt processing routine 310 next branches to a routine 358 for implementing a delay in closing a valve that delivers fuel to the engine. A bit is checked 359 (set in the safety module see below) and if it is set a fuel delay variable is incremented. A test is performed to determine if the fuel cutoff delay has been reached and if has not, the routine 310 returns. If the delay has been reached the processor 120 grounds the magneto and clears the fuel delay variable and then the interrupt processing routine returns 399. In the exemplary embodiment of the invention the fuel delay is one second. This delay allows gasoline in the fuel line to be burned prior to the controller implementing a step of grounding the magneto.

TMR1 ISR

Figure 9:
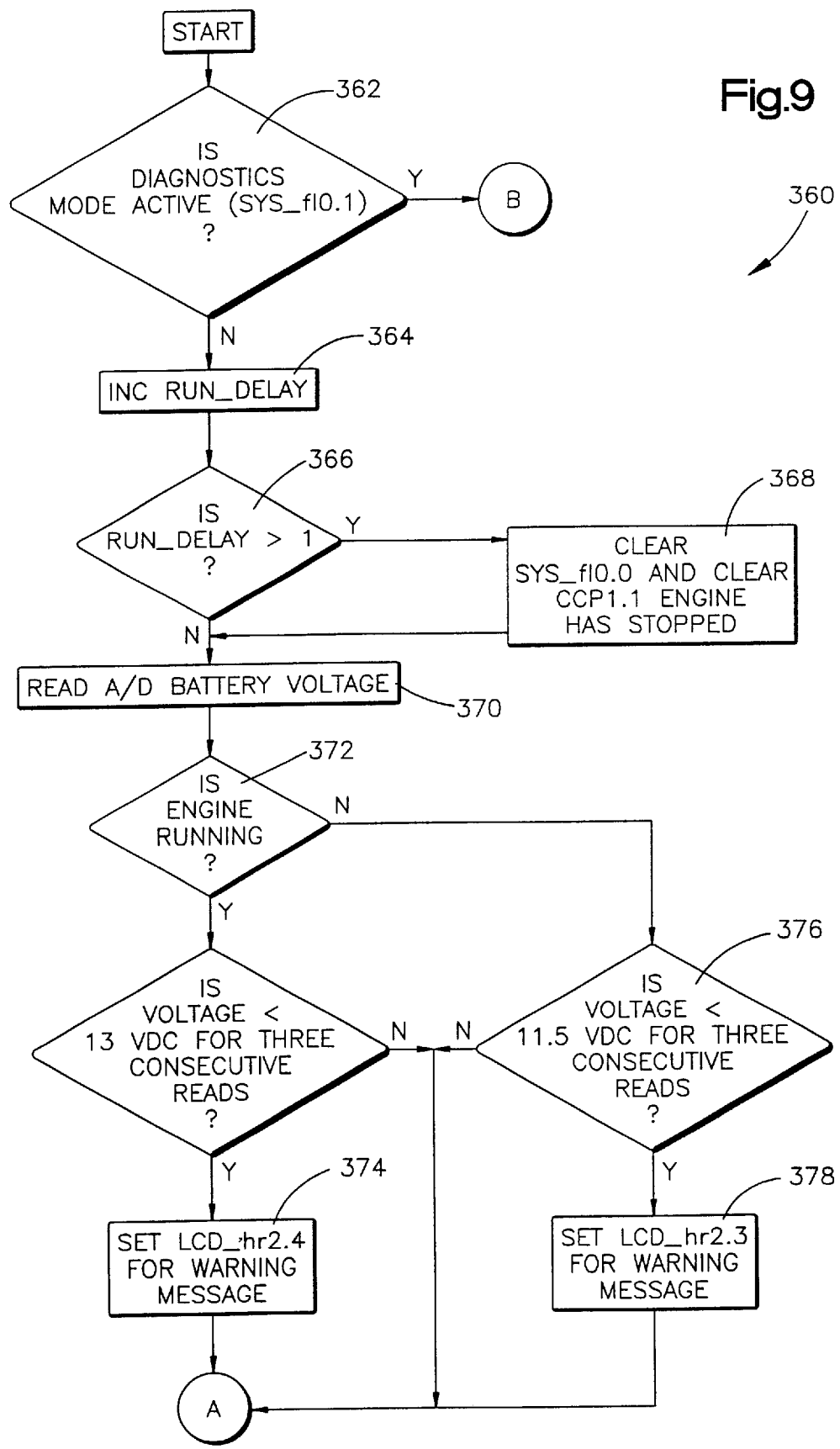
Figure 9A:
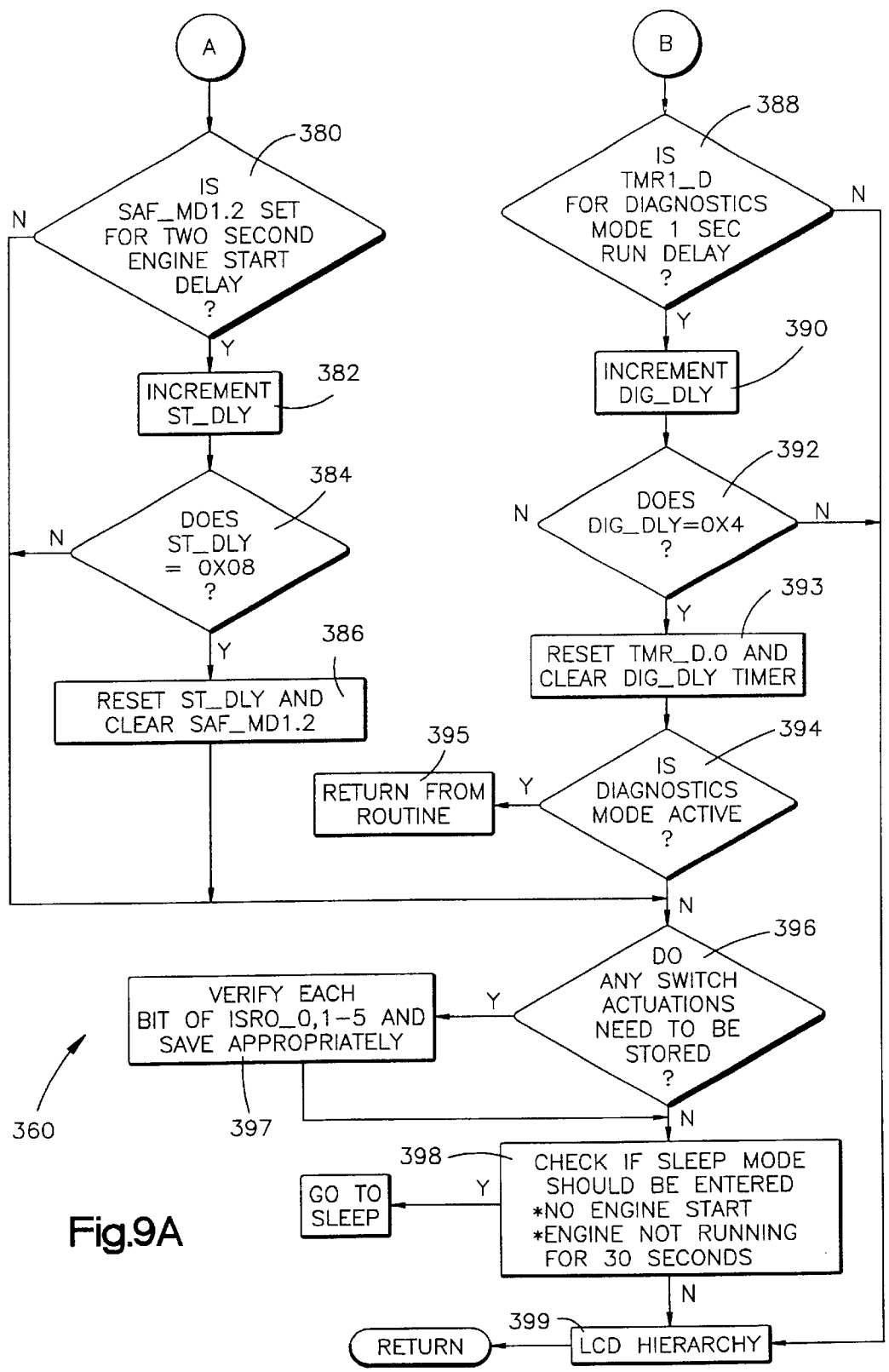

The second timer interrupt routine 360 is depicted in FIGS. 9 and 9A. This second routine executes every 0.262 seconds (approx ¼ second) and is accessed based on a count of the controller's free running counter. The routine 360 begins by checking 362 to see if the diagnostics bit has been set and hence the controller is running in diagnostics mode. Assume it is not. A Branch is taken to increment 364 a counter designated "RUN_DELAY" and a test performed 366 to see if this counter is greater than one. Receipt by the controller 120 of a magneto pulse resets this counter in the CCP1 routine discussed below. As a result, this counter will be greater than one if no magneto pulses have been received for one half of a second. This is an indication that the engine has stopped or is not running. In either event the controller clears 368 the engine running bit (sys_f10.0) and a tachometer ready bit used by the interrupt routine CCP1.

At a next step 370 the controller reads A/D inputs from the battery 130 to check its voltage. The controller then determines 372 if the engine is running. If it is, the alternator 166 should maintain a charge of 13 volts DC on the battery. If the controller senses a voltage lower than this threshold for three consecutive executions of the routine 360 a warning message bit (LCD_hr2.4) is set 374 for display on the display 122 indicating a fault in the charging circuit. If the engine is not running, the controller checks 376 to see if the battery voltage is less than 11.5 volts. If a voltage less than 11.5 volts is sensed, a bit is set 378 to display a message indicating the battery needs to be charged.

At a next step 380 (FIG. 9A) the controller checks to see if a two second delay has been requested by the safety module whose flow chart is depicted in FIG. 5. When the user attempts to start the engine, the key is switched to the start position and once the engine starts the key is switched back to the run position. When this sequence of events occurs, a two second delay is instituted by setting a bit designated saf_md1.2. The two second delay is used after the engine starts to allow engine speed to become stable before engine speed is sensed.

If the delay bit is set, a counter (ST_DLY) is incremented 382 and a test performed 384 to see if the two second delay has occurred. If the two second delay has occurred, the counter is reset and the designated bit (saf_md1.2) cleared 386.

The routine next determines 396 if any switch actuations need to be stored. This done by checking bit variables in a variable ISR0_0 (see table 1) and storing the actuation for a switch to the EEPROM portion of controller memory. The controller next determines if the controller should be placed into sleep mode. This is done if no start signal is present and the engine has not been running for 30 seconds.

The steps performed by the microprocessor to put itself into sleep mode are to display a "GOODNIGHT" message on the display 122 and initiate steps to reduce energy consumption by the controller 120. The controller 120 puts all its I/O interfaces (except for the interface with the ignition switch) with the circuit board into tri-state mode, disables it's A/D converter, and disables the LCD driver. It also powers down the operating voltage to the circuit board with the exception of the operating voltage needs of the microprocessor.

Figure 11B:
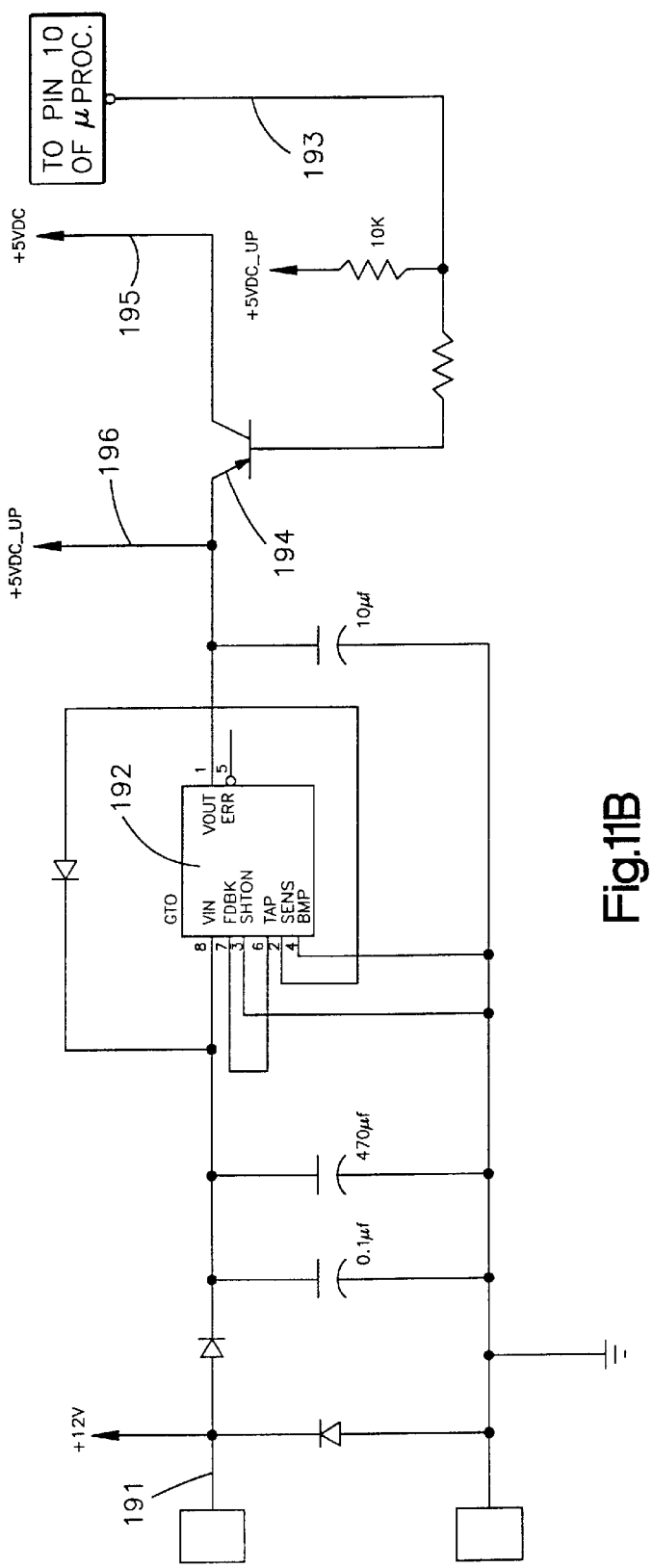
Figure 12:
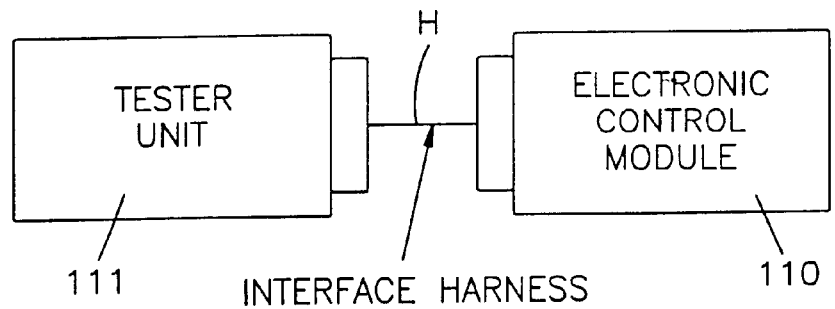
FIG. 12 is a block diagram showing an exemplary control system coupled to a tester circuit for monitoring operation of the control system.

Turning to FIG. 11B, the printed circuit board includes an input 191 from the battery 130 which is coupled to a voltage regulator 192. By putting an output 193 from the microprocessor into tri-state mode, a transistor 194 is turned off. This disconnects power to a five volt output 195 which powers much of the circuitry on the printed circuit board. A second five volt signal 196 remains powered and more particularly this signal is applied to the microprocessor to allow the microprocessor to continue to monitor the ignition switch so that the sleep mode can be exited in response to a user turning the ignition key. When the controller exits sleep mode, the controller branches to a portion of the flowchart seen in FIG. 3 just before the step 230 where the power up routine 210 debounces the switches.

Referring again to FIG. 9A, at the step 399 the controller 120 determines which message to display on the LCD display 122. The message that is displayed depends upon the settings of the various bits in a sequence of status bytes LCD_hrX found in Table 1. By determining the status of the bits contained in these status bytes the step 399 determines which ascii message to load into a display buffer for display to the user. These messages can, as mentioned previously be updated by reprogramming of the EEPROM memory of the controller.

When in diagnostic mode the routine 360 branches to perform a test 388 to see if a one second delay bit (saf_md1.2) is set. If so a counter is incremented 390 and a test made 392 to determine if the one second delay has occurred. If it has, the counter is reset and a bit cleared 393. This bit is checked at the decision step 436 of the diagnostics routine 400. (FIG. 6) The one second delay is only initiated in diagnostics mode so that if the one second delay bit is not set in the diagnostics routine 400 a branch is taken to update 399 the LCD display 122

CCP1 interrupt

The CCP1 interrupt routine 510 is depicted in the flow chart of FIG. 10. This routine is executed each time a magneto pulse is received at the interface circuit between the controller 120 and the magneto. This routine starts by testing 512 a status of a tach ready bit that is set by the TMR0 interrupt processing routine. A yes indication indicates that the type of engine has already been determined and a branch determines 514 whether the engine is a single or a two cylinder engine. Each engine type has its own special magneto coil signature. If the engine is a single cylinder engine, the routine 520 depicted in FIG. 10A is executed. This routine is a single step 522 which executes the a revolution counter variable and sets an engine running bit (sys_f10.0) and clears a timer variable (run_delay) for the interrupt service routine TMR1. Recall that this system bit is tested at a step 312 wherein the hour meter is updated and the run_delay variable is used to determine if the engine is running by the TMR1 routine.

Figure 10B:
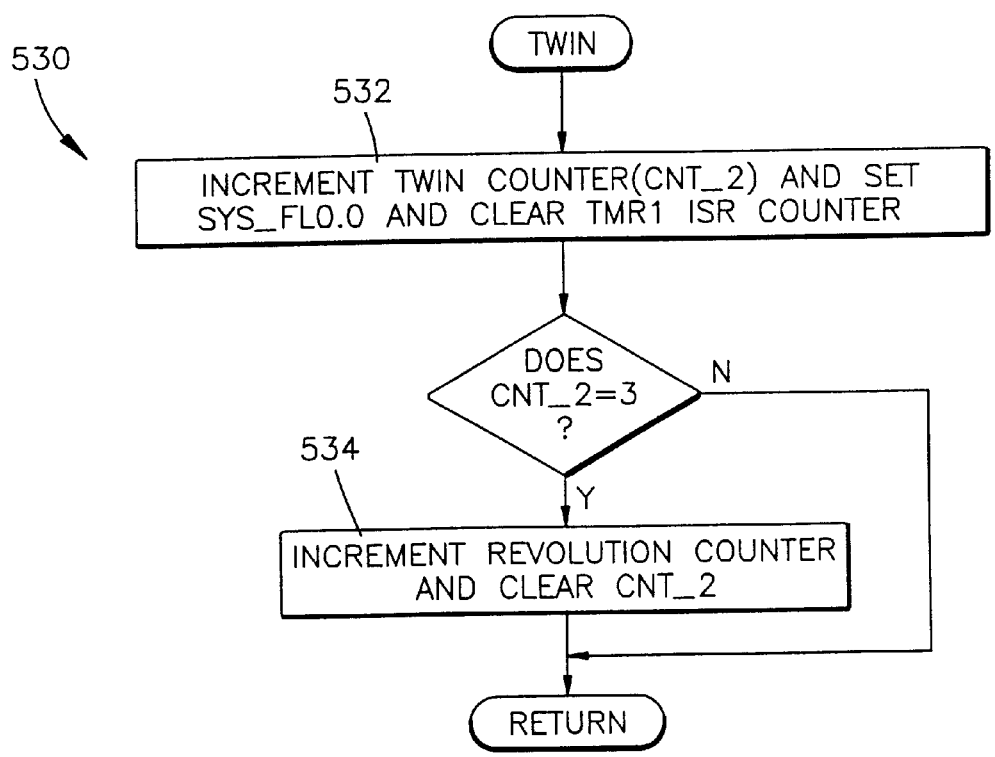

If the engine is a twin engine, each revolution produces two magneto pulses within a short interval and then a third pulse at the beginning of a next subsequent revolution. The routine 530 of FIG. 10B has a counter CNT_2 that counts pulses for the twin cylinder engine and updates 534 this counter upon receipt of three pulses. The routine 530 also increments this counter and sets the appropriate bits and counters at a step 532 of the routine 530. Thus once the tach ready bit is set, receipt of pulses are simply handled by the routine CCP1.

Returning to the step 512 in FIG. 10, assume a tach ready bit (CCP1 bit 1) is not set. A test is performed 540 to see if a start signal is present. If it is the user is attempting to start the engine so no magneto pulses need to be treated and the routine 510 returns 544. If the start signal is not high and a magneto pulse is sensed (hence CCP1 interrupt routine is executing) a test 546 is made to see if a two second delay period (indicated by bit saf_md1.2) has occurred. This allows the engine operation to stabilize after the engine starts. If the delay has not occurred the routine 510 returns 544.

A next section of code times intervals between three successive magneto pulses. If a first in a series of pulses is received as indicated by a test 550 a timer is reset 552 and the routine 510 returns 544. If it is the second pulse, the TMR1 variable is stored 554 in a CCP1 result variable and the routine returns 554. If it is the third pulse in a sequence of three the result is stored and a comparison made between the time difference between successive pulses. For a single cylinder engine the difference in time between two successive pulses should be small so that if the difference is less than 1 millisecond as indicated by a test 560 it is assumed a single cylinder engine is used. Within each revolution for a twin cylinder engine, two pulses occur close together and then a larger gap occurs before the next pulse for the succeeding revolution. Thus, a time separation between pulses greater than 1 millisecond indicates a twin cylinder engine is being monitored. In either event, a tach ready bit is set as are bits telling the CCP1 routine whether the engine is a twin or a single cylinder engine. From that point on, the CCP1 routine merely updates engine speed by counting engine revolutions for the TMR0 routine 310.

Safety Module

Instructions that implement the safety module are depicted in a process 600 shown in the flowcharts of FIGS. 5A, 5B, and 5C. This process 600 is called by the main processing routine after a switch status has been debounced.

A first step 602 of the safety module is to determine if the start switch input from the ignition did a lo to hi transition by checking a bit (saf_md1.0) stored in memory. If it did, the user is trying to start the engine. The routine 600 responds by clearing the starter input transition bit 606 and disabling the CCP interrupt that responds to receipt of magneto pulses. A bit is set 607 indicating the user is attempting to start the engine and a test performed 608 to see if the PTO switch is closed indicating the user wishes to engage the PTO (mowing blades for example). If the PTO switch is closed a branch is taken to a step 610 where an LCD status bit is set and then a step 612 is performed to short the magneto, disengage the mowing blades and disrupt delivery of fuel to the engine. The routine 600 has prevented starting of the engine and opened the fuel solenoid valve and then returns 601 at a step depicted in FIG. 5B.

Note, in the control system of FIG. 2 this process is redundant since the act of starting the engine by moving the ignition key couples battery voltage to the starter through the double pole PTO switch and more particularly through a contact that opens when the PTO is engaged.

Returning to the safety module process 600 in FIG. 5A, assume the PTO switch is not closed so that a branch is taken to clear 611 the PTO safety bit message and test 613 to determine if the brake is on or off. If the brake is off, the user is attempting to start the engine with the brake off and a bit is set 614 for displaying a warning message and the step 612 performed to inhibit engine starting. If it is determined that the brake is on at the step 613, the warning message bit is cleared 615 and the routine returns 601. In the embodiment of FIG. 2 actual starting of the engine is performed by coupling the battery voltage to the starter through the starter solenoid. In the embodiment of FIG. 2A, the safety module 600 would include a separate step of outputting a signal for starting the engine.

Assume at the very beginning of the process 600 that an engine start was not being attempted. The routine 600 branches to a test 604 which determines if the start switch input (S in FIG. 2) did a hi to low transition meaning the user switched the ignition switch away from the start position (presumably due to a successful start of the engine). The process 600 responds by a step 620 that re-enables the CCP1 interrupt (summarized in FIGS. 10 and 10A) and sets a bit (saf_md1.2) to initiate a two second delay timer. A start attempt bit (saf_md1.3) is then cleared 622 and the routine 600 returns 601. Subsequent to the two second delay set up here the engine is presumed to be running smoothly and the tachometer function performed by the TMR0 interrupt processing routine is enabled. Clearing of this delay bit is done by the TMR1 interrupt processing routine.

The sequence of tests depicted in FIG. 5B is performed if no transition (neither hi to low nor low to hi) of the start input occurs. Under these circumstances the test 604 is negative and a branch is taken to a decision step 630 (FIG. 5B) of the routine that checks to see if the run signal from the ignition switch is high. If the run input is high, a branch is taken to the flowchart of FIG. 5C. Assume the ignition switch run input is not high. A branch is taken to a step 632 which determines if the engine running bit is set (sys_f10.0). If the engine is running but the run switch signal is low, the user wishes to turn off the engine. The controller 120 performs a step 634 of turning off the fuel solenoid and deactivating the PTO clutch and setting a delay bit (saf_md1.4). The controller responds to the setting of this bit by waiting 636 a short delay period and performs two tests 640, 642 to determine if the fuel solenoid and the clutch were actually deactivated.

These confirming tests are performed by determining a voltage on I/O circuitry coupled to the clutch and fuel solenoids. Stated another way, the microprocessor outputs signals to I/O circuitry on the board coupled to the solenoids and the two tests 640, 642 confirm that the I/O circuits actually produce appropriate output signals to the solenoids. If control over either the PTO clutch or the Fuel solenoid is lost, steps 644, 646 are performed to update the display 122 with an appropriate warning message and the safety module returns to the main processing loop.

Assume the branch from the step 630 to the portion of the process depicted in FIG. 5C is performed. This means the run signal input from the ignition switch is high. A test is performed 650 to see if the seat is occupied as indicated by a seat switch occupied bit (stored in SW1). If the seat is not occupied, it is acceptable that the engine continue running so long as the brake is engaged. A check is performed 652 to see if the PTO switch has been actuated. If it has been, an unsafe condition exists since the PTO has been engaged and the seat is not occupied. In response to this condition the clutch for engaging the blades is de-energized at a step 654. This same step 654 also sets a latch bit and confirms or verifies the disengaged status of the PTO clutch. Recall that this step 654 is reached if the seat is not occupied and the PTO is engaged. So long as the brake is on, the process disengages the clutch and allows the engine to continue to run. A test is performed 656 to see if the brake is on. If the brake is not on, a branch 658 is performed to branch to the step 634 (FIG. 5B) where the fuel solenoid is de-energized to assure the engine is stopped. If the brake is on, a safe condition exists and the fuel solenoid is turned on and the magneto ungrounded 657 to allow the engine to continue running or start.

If the test 650 results in a branch to a test 670 to check the PTO status, the seat is occupied so that it is acceptable for the PTO to be engaged. If the PTO is engaged, a branch is taken to determine 672 if a latch bit (saf_md1.5) is set. This bit is set by the controller at the step 654 in response to sensing an unsafe condition to inhibit re-engagement of the blades. As seen in FIG. 5C, this bit is cleared at a step 676 that is only reached if the seat is occupied and the PTO switch is not engaged.

In the exemplary embodiment, when the controller senses that the seat is not occupied and subsequently senses that the seat becomes occupied the controller does not allow the clutch to re-engage the mower blades until the PTO switch is moved to the disengage position and back to the engage position. This prevents the blades from becoming reengaged if the operator leaves the seat and the mower rolls over such that the seat and seat switch are depressed under the weight of the tractor.

Returning to the flowchart, if the latch bit is not set, a test 678 is performed to see if the reverse switch is on. If it is not the LCD display 122 is updated to indicate the PTO is engaged. If the tractor's reverse switch is closed, the clutch is disengaged at the step 674 and the latch bit is set. In the exemplary embodiment of the invention, mowing is not allowed in reverse. From the step 674 returns 601 from the safety module and the main processing loop again performed.

The present invention has been described with a degree of particularity. It is the intent, however, that the invention include all modifications and alterations from the disclosed design falling within the spirit or scope of the appended claims.

What is claimed is:

1. Control apparatus for monitoring and controlling operation of a lawn mower, said lawn mower including a mowing blade and further including an input switch that controls operation of a lawn mower source of power, said control apparatus comprising:

a) a programmable controller for monitoring a status of said lawn mower, said controller including i) a controller interface for monitoring inputs relating to a status of said lawn mower and for controlling outputs that regulate operation of the lawn mower and ii) said controller further including a controller memory for storing instructions to implement a control over operation of the lawn mower; and b) a visual display coupled to the programmable controller for displaying an updated status of the mower wherein said instructions enable said controller to determine a status condition based on sensed inputs and to output a signal from the interface of said controller that updates the display based on said status condition;

c) said controller including in said controller memory a specific message for display on the visual display at predetermined intervals during operation of said lawn mower.

2. The control apparatus of claim 1 wherein the controller interface includes an I/O port for receipt of messages for storage in the controller memory for display on the visual display.

3. Control apparatus for monitoring and controlling operation of a lawn mower, said lawn mower including a clutch for engaging a blade and further including an input switch that controls operation of a lawn mower source of power that selectively rotates the blade based on a condition of the clutch, said control apparatus comprising:

a) a programmable controller for monitoring a status of said lawn mower, said controller including i) a controller interface for monitoring inputs relating to a status of said lawn mower and for controlling outputs that regulate operation of the lawn mower and ii) said controller further including a controller memory for storing instructions to implement a control over operation of the lawn mower;

b) said instructions including instructions for determining a safety status condition based on sensed inputs and outputting a signal from the interface of said controller that both disengages the clutch and inhibits operation of the source of power in response to a sensing of an unsafe condition.

4. The control apparatus of claim 3 wherein the lawn mower source of power comprises an internal combustion engine and wherein the programmable controller includes instructions that inhibit operation of said lawn mower by shorting a connection across an engine magneto and also disrupts supply of fuel to said engine.

5. The control apparatus of claim 3 wherein the lawn mower source of power comprises an internal combustion engine having a fuel injection system and wherein the programmable controller includes instructions that inhibit operation of said lawn mower by stopping a flow of fuel to said fuel injection system.

6. The apparatus of claim 3 wherein the lawn mower comprises a plurality of switches and wherein the instructions of the programmable controller stores a count of switch actuations for at least one of said switches and stores said count in a non-volatile memory.

7. Control apparatus for monitoring and controlling operation of a lawn mower, said lawn mower including a mowing blade and further including a first input switch that controls operation of a lawn mower source of power, said control apparatus comprising:

a) a programmable controller for monitoring a status of said lawn mower, said controller including i) a controller interface for monitoring inputs relating to a status of said lawn mower and for controlling outputs that regulate operation of the lawn mower and ii) said controller further including a controller memory for storing instructions to implement a control over operation of the lawn mower; and b) said controller interface coupled to a plurality of input switches for monitoring a plurality of signals corresponding to status conditions of said plurality of input switches during operation of the lawn mower;

c) said instructions including instructions for storing a number of switch actuations for one or more of said plurality of input switches in a non-volatile memory.

8. Control apparatus for monitoring and controlling operation of a lawn mower, said lawn mower including a mowing blade and further including a first input switch that controls operation of a lawn mower source of power, said control apparatus comprising:

a) a programmable controller for monitoring a status of said lawn mower, said controller including i) a controller interface for monitoring inputs relating to a status of said lawn mower and for controlling outputs that regulate operation of the lawn mower and ii) said controller further including a controller memory for storing instructions to implement a control over operation of the lawn mower;

b) said controller interface coupled to a plurality of input switches for monitoring a plurality of signals corresponding to status conditions of said plurality of input switches during operation of the lawn mower; and c) a connector for routing signals to the controller interface from switches supported by the lawn mower and further comprising a test circuit that can be coupled to the connector for communicating signals to and from the programmable controller.

9. The controller of claim 8 wherein the test circuit simulates a lawn mower circuit external to the controller for determining an operating status of said controller without being connected to a lawn mower.

10. The controller apparatus of claim 8 wherein the test circuit communicates data for reprogramming operation of the controller.

11. Control apparatus for monitoring and controlling operation of a lawn mower, said lawn mower including a mowing blade and further including a source of power for rotating the blade, said control apparatus comprising:

a) a programmable controller for monitoring a status of said lawn mower, said controller including i) a controller interface for monitoring inputs relating to a status of said lawn mower and for controlling outputs that regulate operation of the lawn mower and ii) said controller further including a controller memory for storing instructions to implement a control over operation of the lawn mower; and b) wherein the lawn mower source of power comprises an engine or motor that is one of a number of types and wherein the controller determines a drive type by evaluating signals from the engine or motor that vary depending on engine or motor type.

12. The control apparatus of claim 11 wherein the lawn mower includes an internal combustion engine that includes a spark generating device for creating a spark at specified intervals to ignite fuel in one or more cylinders of said engine and further wherein said controller interface includes circuitry for converting signals from the spark generating device to determine an engine type.

13. The control apparatus of claim 12 wherein the controller monitors time intervals between receipt of said signals from the spark generating device in order to determine engine type.

14. The control apparatus of claim 13 wherein the timing of receipt of signals from the spark generating device is used by the controller to determine engine speed.

15. The control apparatus of claim 14 wherein the controller distinguishes between a single cylinder and a two cylinder internal combustion engine based on the signal timing.

16. Control apparatus for monitoring and controlling operation of a lawn mower, said lawn mower including a mowing blade and further including an ignition switch that controls operation of a lawn mower source of power that rotates said blade by coupling a battery signal through a lawn mower ignition system in response to user actuation of said ignition switch, said control apparatus comprising:

a) a programmable controller for monitoring a status of said lawn mower, said controller including i) a controller interface for monitoring inputs relating to a status of said lawn mower and for controlling outputs that regulate operation of the lawn mower and ii) said controller further including a controller memory for storing instructions to implement a control over operation of the lawn mower; and b) a visual display coupled to the programmable controller for displaying an updated status of the mower wherein said instructions enable said controller to determine a status condition based on sensed inputs and to output a signal from the interface of said controller that updates the display based on said status condition;

c) said controller interface including an input for monitoring battery voltage and updating the visual display based on a sensed battery voltage.

17. The apparatus of claim 16 wherein the battery voltage is coupled to a starter and the message informs a user when the sensed battery voltage is too low to operate said starter.

18. The control apparatus of claim 16 wherein the lawn mower includes an internal combustion engine and an alternator for charging the battery and wherein the programmable controller monitors battery voltage with the engine running and wherein the visual display is updated to indicate a problem with charging of the battery.

19. Control apparatus for monitoring and controlling operation of a lawn mower, said lawn mower including a mowing blade, a source of power for rotating the blade, and including an starter system having a battery that controls operation of said source of power, said control apparatus comprising:
   a) a programmable controller for monitoring a status of said lawn mower, said controller including i) a controller interface for monitoring inputs relating to a status of said lawn mower and for controlling outputs that regulate operation of the lawn mower and ii) said controller further including a controller memory for storing instructions to implement a control over operation of the lawn mower; and
   b) a visual display coupled to the programmable controller for displaying an updated status of the mower wherein said instructions enable said controller to determine a status condition based on sensed inputs and to update the display based on a sensed status condition;
   c) said controller interface including an input for determining if the source of power is activated and wherein said instructions place the programmable controller in a low power consumption mode to conserve battery life.

20. The apparatus of claim 19 wherein the controller times a period of no operation of the source of power and activates the low power consumption mode after a specified period of no operation of said source of power.

21. The apparatus of claim 19 wherein the controller disables the monitoring of the status of certain inputs to conserve battery life in said low consumption mode.

22. The apparatus of claim 19 wherein the controller is part of a control system and wherein the controller disrupts power to circuitry external to the controller that forms part of the control system to conserve battery life.

23. The apparatus of claim 19 wherein the controller disables the visual display to conserve battery life.

24. The apparatus of claim 19 wherein the controller includes analog to digital inputs and wherein one or more of the analog to digital inputs are disabled to conserve battery life.

25. A lawn mower or garden tractor comprising:
   a) a chassis, wheels, apparatus for steering the lawn mower or garden tractor, and a power take off;
   b) said chassis defining an operator zone during operation of the lawn mower or garden tractor;
   c) an engine or motor for rotating one or more wheels of the lawn mower or garden tractor;
   d) a first switch that can be actuated by the operator to activate the engine or motor;
   e) a control for selectively engaging the power take off; and
   f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor; and
   g) a visual display coupled to the controller for displaying a status of the lawn mower or the garden tractor based on conditions sensed by inputs to the input and output interface;
   h) said controller including in said controller memory a specific message for display on the visual display at predetermined intervals during operation of said lawn mower.

26. The apparatus of claim 25 wherein the controller interface includes an I/O port for receipt of messages for storage in the controller memory for display on the visual display.

27. The apparatus of claim 25 additionally comprising a control panel in proximity to the operator zone including a sensor mounted to the control panel for monitoring a presence of an operator, said sensor interfacing with the controller.

28. The apparatus of claim 25 additionally comprising a control panel in proximity to said seat including a pad for sensing the presence of a magnetic object which resets one or more memory locations maintained by the controller.

29. The apparatus of claim 25 wherein the controller implements an hourmeter on the visual display based on operation of the lawn mower or garden tractor.

30. The apparatus of claim 29 wherein the hourmeter is updated based on periods of operation of the engine or motor.

31. A lawn mower or garden tractor comprising:
   a) a chassis, wheels, apparatus for steering the lawn mower or garden tractor, and a power take off;
   b) said chassis defining an operator zone during operation of the lawn mower or garden tractor;
   c) an engine or motor for rotating one or more wheels of the lawn mower or garden tractor;
   d) a first switch that can be actuated by the operator to activate the engine or motor;
   e) a control for selectively engaging the power take off; and
   f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor; and
   g) wherein the controller monitors speed of movement of the lawn mower or garden tractor and engine or motor speed and wherein the controller outputs a signal based on the combination of speed of movement and engine or motor speed.

32. The apparatus of claim 31 additionally comprising a visual display coupled to the controller and a cutting blade coupleable to the engine or motor through the power take off and wherein the controller updates the display to convey information about cutting efficiency of the cutting blade on the visual display based on the sensed speed of movement and an engine or motor speed.

33. A lawn mower or garden tractor comprising:
a) a chassis, wheels, apparatus for steering the lawn mower or garden tractor, and a power take off;
b) said chassis defining an operator zone during operation of the lawn mower or garden tractor;
c) an engine or motor for rotating one or more wheels of the riding lawn mower or garden tractor;
d) a first switch that can be actuated by the operator to activate the engine or motor;
e) a control for selectively engaging the power take off; and
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor;
g) wherein the lawn mower or garden tractor includes an internal combustion engine and wherein the programmable controller instructions inhibit operation of said lawn mower or garden tractor by shorting a connection across an engine magneto and additionally discontinues supply of fuel to said engine.

34. A lawn mower or garden tractor comprising:
a) a chassis, wheels, apparatus for steering the lawn mower or garden tractor, and a power take off;
b) said chassis defining an operator zone during operation of the lawn mower or garden tractor;
c) an engine or motor for rotating one or more wheels of the lawn mower or garden tractor;
d) a first switch that can be actuated by the operator to activate the engine or motor;
e) a control for selectively engaging the power take off; and
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor;
g) wherein the lawn mower or garden tractor includes an internal combustion engine and wherein the programmable controller controls delivery of fuel to said engine by means of a fuel solenoid that opens and closes a fuel valve.

35. The apparatus of claim 34 wherein the programmable controller confirms a status of a control signal output to the fuel solenoid for disrupting delivery of fuel to the engine by monitoring a signal coupled to the solenoid that changes state in response to an output from the interface of said controller.

36. The apparatus of claim 34 wherein the controller updates a visual display in the event it is unable to confirm the status based on the monitoring to indicate a loss of control over the fuel solenoid.

37. A lawn mower or garden tractor comprising:
a) a chassis, wheels, apparatus for steering the lawn mower or garden tractor, and a power take off;
b) said chassis defining an operator zone during operation of the lawn mower or garden tractor;
c) an engine or motor for rotating one or more wheels of the lawn mower or garden tractor;
d) a first switch that can be actuated by the operator to activate the engine or motor;
e) a control for selectively engaging the power take off; and
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor;
g) wherein the control for selectively engaging the power take off comprises a clutch and wherein the programmable controller sends a signal to the control to disengage the clutch and confirms a status of the clutch based on a change of state of a signal for monitoring a status of the clutch.

38. The apparatus of claim 37 wherein the controller updates a visual display in the event it is unable to confirm the status based on the monitoring to indicate a loss of control over the clutch.

39. A lawn mower or garden tractor comprising:
a) a chassis, wheels, apparatus for steering the lawn mower or garden tractor, and a power take off;
b) said chassis defining an operator zone during operation of the lawn mower or garden tractor;
c) an engine or motor for rotating one or more wheels of the lawn mower or garden tractor;
d) a first switch that can be actuated by the operator to activate the engine or motor and a plurality of additional switches that control operation of the lawn mower or garden tractor;
e) a control for selectively engaging the power take off;
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor; and
g) wherein the controller stores a count of switch actuations in a controller memory.

40. The apparatus of claim 39 wherein the controller determines a safety status condition of the lawn mower or garden tractor based on a sensing of the status of one or more of the plurality of additional switches and wherein said controller deactivates the source of power in response to the sensed safety status condition.

41. The apparatus of claim 39 comprising a clutch for engaging the power take off and further comprising a power take off control switch for controlling a status of the clutch and wherein the controller determines a safety status condition of the lawn mower or garden tractor based on a sensing of the status of one or more additional input signals and wherein said controller controls a status of said clutch to decouple the source of power from the power take off in response to the sensed safety status condition.

42. The apparatus of claim 41 wherein the controller maintains a clutch state until the user toggles the power take off control switch off and on.

43. A lawn mower or garden tractor comprising:
a) a chassis, wheels, apparatus for steering the lawn mower or garden tractor, and a power take off;
b) said chassis defining an operator zone during operation of the lawn mower or garden tractor;
c) an engine or motor for rotating one or more wheels of the riding lawn mower or garden tractor;
d) a first switch that can be actuated by the operator to activate the engine or motor and a plurality of additional switches that control operation of the lawn mower or garden tractor, said plurality of switches including a power take off switch and a reverse switch;
e) a control for selectively engaging the power take off in response to actuation of the power take off switch;
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor; and
g) said controller including instructions for monitoring simultaneous activation of the reverse and power take off switch and for deactivating the power take off if both the reverse and the power take off switch are actuated.

44. A lawn mower or garden tractor comprising:
a) a chassis, wheels, apparatus for steering the lawn mower or garden tractor, and a power take off;
b) said chassis defining an operator zone during operation of the lawn mower or garden tractor;
c) an internal combustion engine for rotating one or more wheels of the riding lawn mower or garden tractor;
d) a clutch for selectively engaging the power take off;
e) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor;
f) an ignition switch coupled to the controller that can be actuated by the operator to start the engine;
g) a starter coupled to an output of the controller for starting the engine;
h) a single pole switch coupled to the controller for controlling the clutch to selectively engage the power take off input and for monitoring an operator presence on said seat; and
i) a single pole switch coupled to the controller for monitoring an operator presence within the operator zone;
j) said controller monitoring the inputs to determine if a start signal is coupled to the controller from the ignition switch and a safety status of said single pole switches and in response thereto outputting a starter activation signal in response to said start signal to start the engine.

45. A lawn mower or garden tractor comprising:
a) a chassis, wheels, apparatus for steering the lawn mower or garden tractor, and a power take off;
b) wherein a location on the chassis defines an operator zone for an operator to occupy during operation of the lawn mower or garden tractor;
c) an engine or motor for rotating one or more wheels of the lawn mower or garden tractor;
d) a first switch that can be actuated by the operator to activate the engine or motor;
e) a control for selectively engaging the power take off; and
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor; and
g) an optical sensor mounted to the chassis for determining presence of an operator on the lawn mower or garden tractor and for communicating a signal indicating said presence to the controller;
h) said instructions including instructions for disabling one or more functions of the lawn mower or garden tractor in the event a presence of an operator is not sensed by the optical sensor.

46. A lawn mower or garden tractor comprising:
a) a chassis, wheels, a steering wheel for steering the lawn mower or garden tractor, and a power take off;
b) said chassis defining a location of an operator zone for an operator to occupy during operation of the lawn mower or garden tractor;
c) an engine or motor for rotating one or more wheels of the lawn mower or garden tractor;
d) a first switch that can be actuated by the operator to activate the engine or motor;
e) a control for selectively engaging the power take off;
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor; and
g) a sensor mounted to the chassis within reach of the operator for monitoring a presence of a magnetic object for resetting one or more memory locations of said controller in response to the operator moving an magnetic object into proximity to said sensor.

47. A lawn mower or garden tractor comprising:
a) a chassis, wheels, apparatus for steering the lawn mower or garden tractor, and a power take off;
b) said chassis defining a location on the chassis for an operator to occupy during operation of the riding lawn mower or garden tractor;
c) an engine or motor for rotating one or more wheels of the lawn mower or garden tractor;
d) a first switch that can be actuated by the operator to activate the engine or motor;
e) a control for selectively engaging the power take off;
f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a controller memory for storing data to implement a control over operation of the lawn mower or garden tractor;

g) a battery for providing power to said controller; and h) a wiring harness for coupling signals from the first switch and one or more other switches to said controller for conveying a status of the lawn mower or garden tractor to the controller, said wiring harness including a connector that can be disconnected to expose an I/O port of the controller to signals from an alternate source for adjusting data stored in said controller memory.

48. The apparatus of claim 47 additionally comprising a circuit having an interface for engaging the connector to reprogram portions of said controller memory subsequent to installation of said controller on the chassis of the lawn mower or garden tractor.

49. A lawn mower or garden tractor comprising:

a) a chassis, wheels, apparatus for steering the lawn mower or garden tractor, and a power take off;

b) said chassis defining an operator zone during operation of the lawn mower or garden tractor;

c) an engine or motor for rotating one or more wheels of the riding lawn mower or garden tractor;

d) one or more lamps for illuminating a region of the lawn mower or garden tractor;

e) a first switch that can be actuated by the operator to activate the engine or motor and a plurality of additional switches that control operation of the lawn mower or garden tractor; and f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor;

g) wherein the controller maintains at least one lamp in an on condition subsequent to a shutting down of the engine or motor.

50. The apparatus of claim 49 wherein the controller maintains the at least one lamp illuminated for a timed interval after said shutting down of the engine or motor.

51. A lawn mower or garden tractor comprising:

a) a chassis, wheels, apparatus for steering the lawn mower or garden tractor, and a power take off;

b) said chassis defining an operator zone during operation of the lawn mower or garden tractor;

c) an engine or motor for rotating one or more wheels of the riding lawn mower or garden tractor;

d) a first switch that can be actuated by the operator to activate the engine or motor and a plurality of additional switches that control operation of the lawn mower or garden tractor;

e) a battery and supported by said chassis; and f) a controller for monitoring a status of said lawn mower or garden tractor, said controller including i) an input and output interface for monitoring inputs relating to a status of said lawn mower or garden tractor and controlling outputs that regulate operation of the lawn mower or garden tractor and ii) further including a memory for storing instructions to implement a control over operation of the lawn mower or garden tractor;

g) wherein said controller is coupled to the battery to monitor battery voltage and further comprises an interface for coupling to a battery charger for routing battery charger signals to said battery in response to a sensed low battery voltage.

52. A process for controlling operation of a lawn mower or garden tractor having a control for engaging a power take off and an ignition system that controls running of an engine or motor, said process comprising:

a) monitoring a status of said lawn mower or garden tractor by routing input signals representing a status of said lawn mower or garden tractor to a controller;

b) saving one or more status indicating variables in a controller memory for use in implementing a control over operation of the lawn mower or garden tractor;

c) outputting control outputs from a controller interface that regulate operation of the lawn mower or garden tractor;

d) determining a condition of the lawn mower or garden tractor based on sensed input signals and the one or more status indicating variables; and e) outputting a signal from the interface of said controller to a visual display at a specified time during operation of the lawn mower or garden tractor to display one or more messages stored in a memory of said controller.

53. The process of claim 52 wherein the controller executes a diagnostic mode of operation wherein a status condition of a number of inputs to the controller is monitored and updated on the visual display.

54. The process of claim 53 wherein the controller is coupled to a number of switches for controlling an operating state of said lawn mower or garden tractor and wherein the controller poles a status of said switches in said diagnostics mode and updates the display based on a status of said switch.

55. The process of claim 53 wherein an ignition switch is toggled on an off a specified number of times in a specified interval to cause the controller to enter said diagnostic mode.

56. The process of claim 52 wherein lawn mower or garden tractor has a plurality of switches and wherein the monitoring step repeatedly determines a status of said switches and stores a count of switch actuations in said controller memory.

57. The process of claim 52 wherein the controller determines a safety status condition by comparing the number of switch actuations of different switches to determine if all switches are properly functioning.

58. The process of claim 52 additionally comprising providing a visual output indicating a service reminder to a user based a time period of operation of the lawn mower or garden tractor.

59. The process of claim 52 wherein the lawn mower or garden tractor includes a gasoline powered engine and additionally comprising a step of outputting a signal for inhibiting continued operation of the lawn mower or garden tractor both shorts an engine magneto and disrupts delivery of fuel to an the engine to provide a redundant means of inhibiting further operation of said lawn mower or garden tractor.

60. The process of claim 59 wherein the controller delays shorting of the magneto to allow fuel contained in a fuel line to be burned.

61. The process of claim 52 comprising the step of mounting a sensor pad to the lawn mower or garden tractor control panel and resetting one or more memory locations of said controller in response to bringing an object into proximity with the sensor pad.

62. The process of claim 52 wherein the controller executes an operating system that can be updated by a communications interface with the controller.

63. The process of claim 52 wherein the display messages are changed by means of messages sent to the controller by a communications interface with said controller.

64. The process of claim 52 wherein the controller includes a non-volatile memory and wherein the controller stores a count of switch actuations in said non-volatile memory for subsequent access.

65. The method of claim 52 wherein the controller is coupled to a number of switches for controlling an operating state of said lawn mower or garden tractor and additionally comprising the step of coupling input signals from one or more switches to said controller by providing a regulated current to an input switch terminal and monitoring a voltage drop across the input switch to determine its open or closed status based upon said voltage drop.

66. Control apparatus for monitoring and controlling operation of a lawn mower or garden tractor, said lawn mower or garden tractor including a control for engaging a power take off from a source of power, said control apparatus comprising:

a) a first input switch that controls operation of a source of power that selectively rotates the power take off, b) one or more additional input switches that control operation of said lawn mower or garden tractor;

c) a programmable controller for monitoring a status of said lawn mower or garden tractor, said controller including i) a controller interface for monitoring inputs relating to a status of said lawn mower or garden tractor and for controlling outputs that regulate operation of the lawn mower and garden tractor ii) said controller further including a controller memory for storing instructions to implement a control over operation of the lawn mower; and d) interface circuitry for coupled status signals from at least one input switch to said controller, said interface circuitry providing a regulated current to an input switch terminal and monitoring a voltage drop across the input switch to determine its open or closed status.

67. The apparatus of claim 66 wherein the interface circuitry comprises a regulated current source including a transistor coupled to one terminal of said input switch and a comparator having a reference input for defining a switch point of said comparator and including a non-reference input coupled to said one terminal of said input switch for monitoring a voltage on said one terminal, said comparator including an output for communicating a switch state to said controller.

* * * * *